United States Patent
Ramakrishnan et al.

(10) Patent No.: US 12,254,319 B2
(45) Date of Patent: Mar. 18, 2025

(54) SCALABLE TOGGLE POINT CONTROL CIRCUITRY FOR A CLUSTERED DECODE PIPELINE

(71) Applicant: Intel Corporation, Santa Clara, CA (US)

(72) Inventors: Sundararajan Ramakrishnan, Cedar Park, TX (US); Jonathan Combs, Austin, TX (US); Martin J. Licht, Round Rock, TX (US); Santhosh Srinath, Menlo Park, CA (US)

(73) Assignee: Intel Corporation, Santa Clara, CA (US)

( * ) Notice: Subject to any disclaimer, the term of this patent is extended or adjusted under 35 U.S.C. 154(b) by 664 days.

(21) Appl. No.: 17/484,969

(22) Filed: Sep. 24, 2021

(65) Prior Publication Data
US 2023/0099989 A1    Mar. 30, 2023

(51) Int. Cl.
G06F 9/30 (2018.01)
G06F 9/38 (2018.01)
G06F 11/07 (2006.01)

(52) U.S. Cl.
CPC ........ *G06F 9/30145* (2013.01); *G06F 9/3812* (2013.01); *G06F 9/3814* (2013.01); *G06F 9/3822* (2013.01); *G06F 11/0757* (2013.01)

(58) Field of Classification Search
CPC .. G06F 9/30145; G06F 9/3812; G06F 9/3814; G06F 9/3822; G06F 11/0757; G06F 9/3836
See application file for complete search history.

(56) References Cited

U.S. PATENT DOCUMENTS

| 6,192,465 B1 | 2/2001 | Roberts |
| 6,212,621 B1 | 4/2001 | Mahalingaiah |

(Continued)

FOREIGN PATENT DOCUMENTS

| WO | 97/35252 A1 | 9/1997 |
| WO | 98/02798 A1 | 1/1998 |

OTHER PUBLICATIONS

European Search Report and Search Opinion, EP App. No. 22188907.4, Feb. 1, 2023, 6 pages.

(Continued)

*Primary Examiner* — Corey S Faherty
(74) *Attorney, Agent, or Firm* — NICHOLSON DE VOS WEBSTER & ELLIOTT LLP

(57) ABSTRACT

Systems, methods, and apparatuses relating to circuitry to implement toggle point insertion for a clustered decode pipeline are described. In one example, a hardware processor core includes a first decode cluster comprising a plurality of decoder circuits, a second decode cluster comprising a plurality of decoder circuits, and a toggle point control circuit to toggle between sending instructions requested for decoding between the first decode cluster and the second decode cluster, wherein the toggle point control circuit is to: determine a location in an instruction stream as a candidate toggle point to switch the sending of the instructions requested for decoding between the first decode cluster and the second decode cluster, track a number of times a characteristic of multiple previous decodes of the instruction stream is present for the location, and cause insertion of a toggle point at the location, based on the number of times, to switch the sending of the instructions requested for decoding between the first decode cluster and the second decode cluster.

24 Claims, 14 Drawing Sheets

(56) References Cited

U.S. PATENT DOCUMENTS

| | | | |
|---|---|---|---|
| 7,398,374 B2 * | 7/2008 | DeLano | G06F 9/3828 |
| | | | 712/E9.071 |
| 10,331,454 B2 * | 6/2019 | Combs | G06F 9/3802 |
| 11,650,818 B2 * | 5/2023 | Shanbhogue | G06F 9/3865 |
| | | | 712/244 |
| 2004/0199755 A1 * | 10/2004 | Sperber | G06F 9/3853 |
| | | | 712/E9.035 |
| 2015/0324239 A1 | 11/2015 | Venkumahanti et al. | |
| 2018/0004512 A1 * | 1/2018 | Combs | G06F 9/30152 |
| 2018/0088956 A1 | 3/2018 | Combs | |

OTHER PUBLICATIONS

Intention to grant, EP App. No. 22188907.4, Nov. 22, 2023, 5 pages.

* cited by examiner

600

RECEIVING AN INSTRUCTION STREAM REQUESTED FOR DECODE BY A HARDWARE PROCESSOR CORE COMPRISING A FIRST DECODE CLUSTER HAVING A PLURALITY OF DECODER CIRCUITS AND A SECOND DECODE CLUSTER HAVING A PLURALITY OF DECODER CIRCUITS
602

↓

DETERMINING, BY A TOGGLE POINT CONTROL CIRCUIT OF THE HARDWARE PROCESSOR CORE, A LOCATION IN THE INSTRUCTION STREAM AS A CANDIDATE TOGGLE POINT TO SWITCH SENDING OF THE INSTRUCTIONS REQUESTED FOR DECODING BETWEEN THE FIRST DECODE CLUSTER AND THE SECOND DECODE CLUSTER
604

↓

TRACKING, BY THE TOGGLE POINT CONTROL CIRCUIT, A NUMBER OF TIMES A CHARACTERISTIC OF MULTIPLE PREVIOUS DECODES OF THE INSTRUCTION STREAM IS PRESENT FOR THE LOCATION
606

↓

INSERTING A TOGGLE POINT AT THE LOCATION, BASED ON THE NUMBER OF TIMES, TO SWITCH THE SENDING OF THE INSTRUCTIONS REQUESTED FOR DECODING BETWEEN THE FIRST DECODE CLUSTER AND THE SECOND DECODE CLUSTER
608

FIG. 6

SCALABLE TOGGLE POINT CONTROL CIRCUITRY FOR A CLUSTERED DECODE PIPELINE

TECHNICAL FIELD

The disclosure relates generally to electronics, and, more specifically, an example of the disclosure relates to circuitry to implement toggle point insertion for a clustered decode pipeline.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 6 is a flow diagram illustrating operations for inserting a toggle point to switch the decoding of an instruction stream between a plurality of decode clusters according to examples of the disclosure.

DETAILED DESCRIPTION

Figure 1:
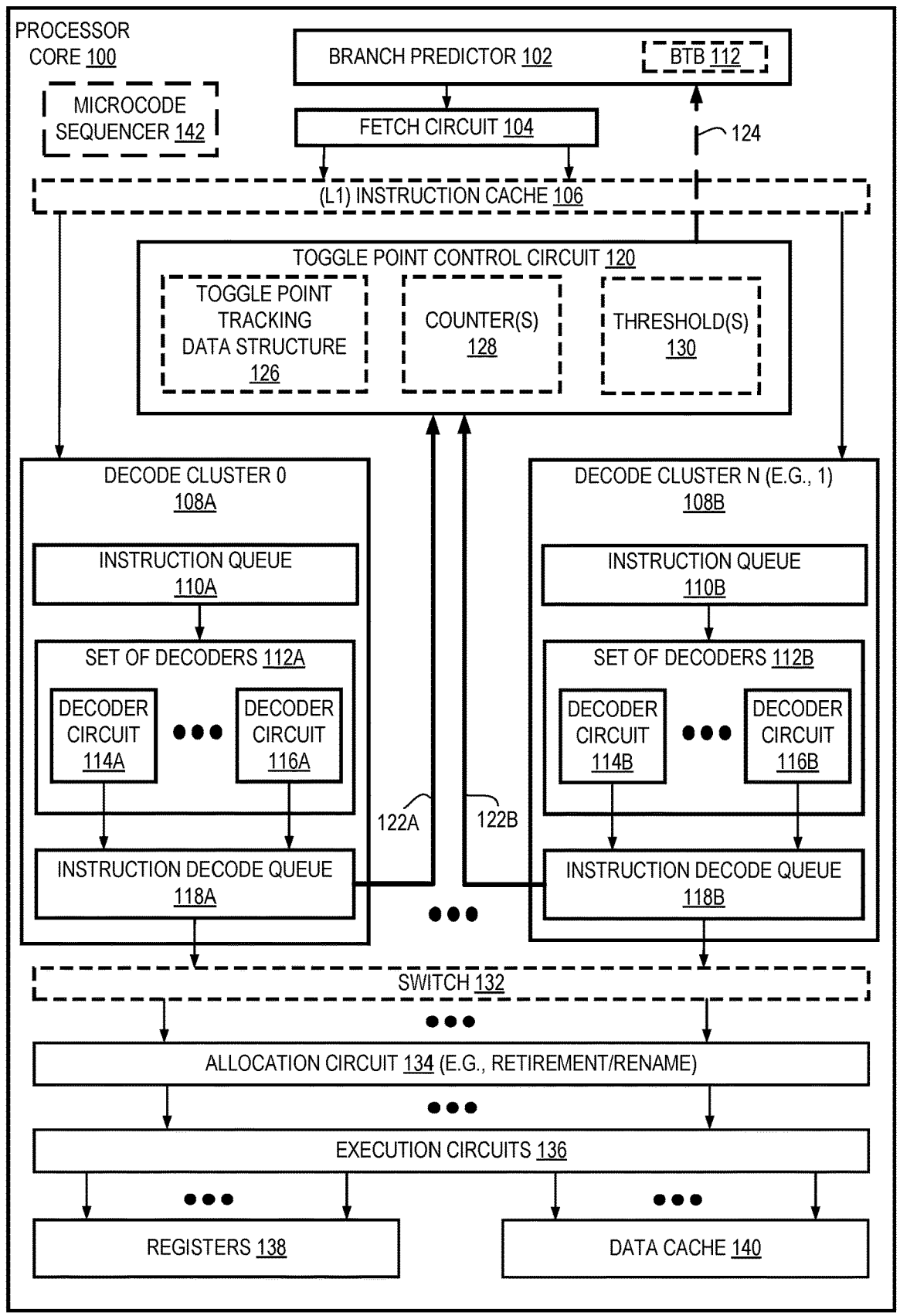
FIG. 1 illustrates a processor core having a plurality of decode clusters and a toggle point control circuit according to examples of the disclosure.

In the following description, numerous specific details are set forth. However, it is understood that examples of the disclosure may be practiced without these specific details. In other instances, well-known circuits, structures, and techniques have not been shown in detail in order not to obscure the understanding of this description.

References in the specification to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

A (e.g., hardware) processor (e.g., having one or more cores) may execute (e.g., user-level) instructions (e.g., a thread of instructions) to operate on data, for example, to perform arithmetic, logic, or other functions. For example, software may include a plurality of instructions (e.g., macro-instructions) that are provided to a processor (e.g., a core or cores thereof) that then executes (e.g., decodes and executes) the plurality of instructions to perform the corresponding operations. In certain examples, a processor includes circuitry (e.g., one or more decoder circuits) to translate (e.g., decode) an instruction into one or more micro-operations (μops or micro-ops), for example, with these micro-operations directly executed by the hardware (e.g., by execution circuits). One or more micro-operations corresponding to an instruction (e.g., macro-instruction) may be referred to as a microcode flow for that instruction. A micro-operation may be referred to as a micro-instruction, for example, a micro-instruction that resulted from a processor's decoding of a macro-instruction. In one example, the instructions are 64 bit and/or 32 bit instructions of an instruction set architecture (ISA). In one example, the instructions are (e.g., 64 bit and/or 32 bit) instructions of an Intel® instruction set architecture (ISA). In certain examples, the translation of an instruction into one or more micro-operations is associated with the instruction fetch and/or decode portion of a processor's pipeline.

Certain processors (e.g., certain cores) implement a plurality of decode clusters (e.g., with each cluster having its own plurality of decoder circuits), e.g., as a way to efficiently increase decode bandwidth. In certain examples, a decoder circuit is to decode an (e.g., macro) instruction into a set of one or more micro-operations that are to be executed (e.g., as a primitive) by an execution circuit(s).

However, in certain examples, (for example, in front-end circuitry, e.g., a front-end fetch unit), the number of instructions being decoded has been parallelized with multiple decode clusters. An issue arising when certain processors (e.g., certain cores) implement a plurality of (e.g., out-of-program-order) decode clusters is how to determine (e.g., allocate) when to switch assigning to-be-decoded instructions from a first decode cluster to a second (or third, etc.) decode cluster. In certain examples, allocating work to multiple decode clusters requires circuitry (e.g., logic circuitry) to translate a series of instructions (e.g., instruction pointers) being generated for decode (e.g., and fetch) (e.g., by a branch predictor) into start and end regions for decode (e.g., fetch and decode). In certain examples, branch instructions (e.g., the prediction of taken branches by a branch predictor) are used to trigger the toggling of an instruction stream from sending the previous instruction(s) in the stream to a first decode cluster to then sending the following instruction(s) in the stream to a second decode cluster, e.g., to provide a chance for each decode cluster to work in parallel on its respective decoding tasks. In certain examples, the last byte of a branch (e.g., branch instruction) ends the current region (e.g., the block being decoded by a first decode cluster) and the target of the taken branch starts the next region (e.g., the block being assigned for decoding by a second decode cluster).

Unfortunately, branches (e.g., taken branches) are not uniformly distributed within all code sequences. This is especially a problem for long sequences of compute focused code where there are very few control flow instructions. Floating-point sequences within certain instruction streams (e.g., the Standard Performance Evaluation Corporation (SPEC) floating-point (FP) benchmarks code, for example) can go for hundreds of instructions without a single taken branch. Such long sequences without a form of toggling effectively narrows a clustered front-end. To address this, certain examples herein utilize dynamic load balancing by inserting toggle points within certain (e.g., long consecutive) code regions.

In certain examples, a processor (e.g., core) relies on existing taken branches in the code to toggle between front-end (e.g., decode) clusters, and thus the most convenient way to insert additional toggle(s) within the (e.g., long sequential) code sequences is to treat selected non-branch instructions within long sequences as if they were taken branches (e.g., only treated that way within the front-end). These toggle points may be referred to as "fake branches". Certain examples thus use a data structure of a branch predictor (e.g., a branch target buffer (BTB)) of a core to have (e.g., store) an indication of these fake branches to allow for toggling and thus an improved load balancing of decode clusters.

Examples herein provide for dynamic load balancing in a clustered front-end, e.g., via the disclosed toggle point (e.g., fake branch) control (e.g., insertion) circuitry and methods herein. Examples herein provide for optimized dynamic load balancing through filtration of toggle point insertion and/or removal. In certain examples, the dynamic load balancing disclosed herein handles both the insertion of optimal toggle points (e.g., fake branches) by making use of a finite state machine (FSM) along with a data structure (e.g., table) of previously seen candidate toggle points. Examples herein provide for an invalidation scheme to deallocate non-optimally located (e.g., in the instruction stream of code) inserted toggle points, e.g., due to code path changes.

Examples herein thus increase decoding parallelism across clustered decoders, minimize pollution in branch predictors, and/or optimize fetch latencies, e.g., all while dealing with the complex nature of dynamic code (e.g., dynamically changing code).

Examples herein provide a clustered decode microarchitecture where the decode clusters are assigned blocks of sequential (e.g., "raw") instruction bytes to decode. In certain examples, breaks in the sequential stream (e.g., taken branches) are used to toggle the instruction stream between decode clusters. However, a lack of toggle points (e.g., due to very long sequences of sequential instructions) restrict parallelism in certain examples. Examples herein disclose toggle point insertion hardware and methods that solve this problem, e.g., by breaking up long instruction streams.

In certain examples, a toggle point control circuit (e.g., filtering control logic) (e.g., and a corresponding data structure (e.g., table)) are critical to deploying dynamic load balancing, e.g., and thus the performance of a clustered front-end. Certain examples herein are directed to circuitry and methods for a scalable toggle insertion filter. The below discusses example circuits (e.g., logic circuits) and a data structure (e.g., table) that controls how to add and how to remove toggle points (e.g., fake branches) for a processor (e.g., core) having a plurality of decode clusters. Certain examples herein do not require a programmer to insert actual taken jumps (for example, that simply jump to the next sequential instruction, e.g., within very long sequences) or another indication to trigger a toggle, e.g., these examples instead include hardware that triggers a toggle by insertion of a toggle point, e.g., a toggle point that is not an actual taken branch (e.g., by inserting a toggle point that is a "fake branch"). Examples herein utilize hardware (e.g., a toggle point control circuit disclosed herein) instead of requiring a human (e.g., programmer) to insert a toggle point, for example, without utilizing the human mind and/or pen and paper, e.g., without utilizing the human mind and/or pen and paper to (i) determine a location in an instruction stream as a candidate toggle point to switch the sending of the instructions requested for decoding between a first decode cluster and a second decode cluster, (ii) track a number of times a characteristic of multiple previous decodes of the instruction stream is present for the location, or (iii) cause insertion of a toggle point at the location, based on the number of times, to switch the sending of the instructions requested for decoding between the first decode cluster and the second decode cluster. It should be understood that in certain examples there are more than two decode clusters, and thus the switch from the "first" cluster to the "second" cluster may be a switch from any decode cluster to any of the other decode clusters, e.g., the next logically consecutive decode cluster.

FIG. 1 illustrates a processor core 100 having a plurality of decode clusters 108A-108B and a toggle point control circuit 120 according to examples of the disclosure. Processor core 100 may be one of a plurality of cores of a processor, e.g., of a system. Depicted processor core 100 includes a branch predictor 102 (e.g., to predict one or more branches of the code (e.g., instructions) that are to be executed by the processor core 100.

In certain examples, branch operations (e.g., instructions) are either unconditional (e.g., the branch is taken every time the instruction is executed) or conditional (e.g., the direction taken for the branch is dependent upon a condition), for example, where instructions to be executed following a conditional branch (e.g., conditional jump) are not known with certainty until the condition upon which the branch depends is resolved. Here, rather than wait until the condition is resolved, branch predictor 102 (e.g., branch predictor circuit) of a processor may perform (e.g., speculative execute) a branch prediction to predict whether the branch will be taken or not taken and/or (e.g., if predicted to be taken) predict the target instruction (e.g., target address) for the branch. In certain examples, if the branch is predicted to be taken, the processor core 100 fetches and speculatively executes the instruction(s) for the taken direction (e.g., path) of the branch, e.g., the instructions found at the predicted branch target address. The instructions executed following the branch prediction are speculative in certain examples where the processor has not yet determined whether the prediction is correct. In certain examples, a processor core 100 resolves branch instructions at the back end of the pipeline circuitry (e.g., in execution circuit(s) 136, and/or retirement (write back) circuit 134). In certain examples, if a branch instruction is determined to not be taken by the processor (e.g., by the back end), then all instructions (e.g., and their data) presently in the pipeline circuitry behind the taken branch instruction are flushed (e.g., discarded). In certain examples, the branch predictor 102 (e.g., branch predictor circuit) learns from past behavior of branches to predict a next (e.g., incoming) branch. In certain examples, the branch predictor 102 predicts a proper subset of (e.g., contiguous in the original program order) instructions as a block of code (e.g., ending in a branch instruction). As one example, processor core 100 may receive code to execute and, in response, may divide the code into blocks.

In certain examples, branch predictor 102 includes a branch target buffer (BTB) 112, for example, to store information about (e.g., real and fake) predicted branches, e.g., predicted taken branches. In certain examples, the branch predictor 102 predicts a target instruction for branch instructions (for example, branch instructions that are likely to be taken (e.g., pre-selected branch instructions)). In certain examples, the branch predictor 102 (e.g., BTB 112 thereof) is thereafter updated with the target instruction for a branch instruction. In certain examples, software manages a hardware BTB, e.g., with the software specifying the prediction mode or with the prediction mode defined implicitly by the mode of the instruction that writes the BTB also setting a mode bit in the entry. In certain examples, each entry for the branch predictor 102 (e.g., in BTB 112 thereof) includes a tag field and a target field. In certain examples, the tag field of each entry in the BTB stores at least a portion of an instruction pointer (e.g., memory address) identifying a branch instruction. In certain examples, the tag field of each entry in the BTB stores an instruction pointer (e.g., memory address) identifying a branch instruction in code. In certain examples, the target field stores at least a portion of the instruction pointer for the target of the branch instruction identified in the tag field of the same entry. In certain examples, the entries for the branch predictor 102 (e.g., in BTB 112 thereof) include one or more other fields. In certain examples, an entry does not (or does) include a separate field to assist in the prediction of whether the branch instruction is taken, e.g., if a branch instruction is present (e.g., in the BTB), it is considered to be taken.

In certain examples, different types of hardware circuitry (e.g., logic circuitry) are implemented for load balancing in out-of-order clustered decoding. For example, in some examples, cluster balancing circuitry implements a back-pressure heuristic that depends on sufficient queuing throughout the processor core's execution pipeline to function correctly. In other examples, cluster balancing circuitry employs, or takes advantage of, branch predictor hardware to drive the assignment of undecoded instructions to a particular decode cluster(s). These assignments may be made in a manner that attempts to balance the workloads of the decode clusters and/or keep all of the decode clusters operating with full, or nearly full, input queues (e.g., instruction queues 110A-110B). In certain examples, cluster balancing circuitry (e.g., toggle point control circuit 120) augments branch target buffer (BTB) 112 entries for predicted taken branches with extra data (e.g., metadata) to force or increase decode parallelism. In certain examples, the cluster balancing circuitry (e.g., toggle point control circuit 120) inserts entries representing "fake predicted taken branches", e.g., and may augment these entries with metadata to force or increase decode parallelism.

In certain examples, branch target buffer 112 includes entries which include information usable to trigger a load balancing action between decode clusters. In certain examples, the branch target buffer 112 is configured to store information about real and fake predicted taken branches. In certain examples, branch target buffer 112 includes a plurality of entries. In certain examples, an entry in branch target buffer 112 includes one or any combination of: (i) a field of each entry to store data representing a branch instruction address (e.g., which is used to access the entry), (ii) a field of each entry to store data representing a predicted target address for the branch instruction whose address is represented by the data in the first field of the entry, e.g., and in the case of entries corresponding to fake predicted branches, the data represents the address of the next instruction in program order, rather than a predicted branch address, (iii) a field of each entry to store data representing a load-balancing weight value (for example, the value in this field may indicate the relative value of data received from downstream components of the execution pipeline indicating the number of micro-operations (uops) delivered to the processor core back end, or to an execution circuit thereof, by each decode cluster or for each block, a decode latency for each cluster or block, and/or an execution latency of each block when compared to one or more threshold values; in certain examples, a "high" value in this field indicates that the obtained data exceeds a threshold value for taking a particular load balancing action (such as forcing a cluster switch or suppressing a cluster switch), a "low" value in this field indicates that the obtained value is less than a threshold value below which a different load balancing action may be taken, and/or a "medium" value in this field indicates that no load balancing action should be taken based on the data obtained from downstream components of the execution pipeline, and/or (iv) a field in each entry to store data representing one or more other tags associated with the corresponding predicted taken branch, e.g., data indicating whether the corresponding entry represents an actual predicted taken branch (e.g., "REAL") or a fake predicted taken branch (e.g., "FAKE").

In certain examples, the entries in a branch target buffer, such as branch target buffer 112, are annotated with any type of information usable to determine whether and when to switch clusters, suppress a cluster switch that would otherwise be made, and/or to bias a decision about whether and when to switch clusters or suppress a cluster switch that would otherwise be made. In certain examples, different numbers of fields may be populated within different entries in target buffer 112. For example, some fields may not be applicable for certain branch instruction encodings. In certain examples, the types of information that is included in each entry of a branch target buffer such as branch target buffer 112 includes numerical data representing uop counts, latency values, instruction cache misses, instruction TLB misses, and/or any other information that may be indicative of an imbalanced workload between multiple decode clusters. In certain examples, the data in one or more fields may represent weighting values calculated by the cluster balancer, fetch circuit (e.g., instruction pointer (IP) generator of fetch circuit 104), or branch predictor based on a heuristic that is a function of two or more pieces of information obtained from downstream components of the execution pipeline, the branch predictor, the retirement pipeline (e.g., retirement unit), the instruction cache, an instruction TLB, or elsewhere. These weighting values may then be compared to one or more threshold weighting values to determine whether and when to take particular load balancing actions. In certain examples, when an instruction miss occurs (e.g., for a look-up by an instruction translation lookaside buffer (TLB)), the fetch circuit 104 forces a cluster switch in order to direct instruction pointer values within the same page to all be decoded by a same decode cluster.

In certain examples, the data in one field included in each entry of a branch target buffer such as branch target buffer 112 explicitly indicates that a cluster switch should be performed when the corresponding branch instruction is encountered. A value may be written into this field (e.g., by the fetch circuit 104 or the toggle point control circuit 120), under particular conditions, to force the cluster switch. In another example, the data in one field included in each entry of a branch target buffer such as branch target buffer 112 explicitly indicates that a cluster switch that would otherwise be performed when the corresponding branch instruction is encountered should instead be suppressed. A value may be written into this field (e.g., by the fetch circuit 104 or the toggle point control circuit 120), under particular conditions, to force the suppression of the cluster switch.

In certain examples, when a toggle is desired from sending instructions for decoding by a first cluster to instead sending instructions for decoding by a second cluster (for example, when and if the number of uops delivered within a block exceeds a threshold value, e.g., a threshold value that is less than 32 and/or is programmable), a "fake" taken branch is inserted into the BTB. This fake branch may be given a branch type encoding within the BTB that is unique to fake branches so as to not trigger bogus branch behavior. Here, the term "bogus branch" may refer to a predicted taken branch on a non-branch, which may typically occur due to alias issues in the BTB 112. In certain examples, when bogus branches are detected, the prediction in the BTB is invalidated. By contrast, in certain examples, a "fake branch" indication is passed down the decode pipeline and, as is done with predicted taken branch updates, the fake branch entry in the BTB 112 is annotated with the final uop count (e.g., or with a value of 0x0 if the final uop count exceeds the threshold) and may include as the target address the next sequential instruction pointer. Unlike in an entry for a normal ("real") predicted taken branch, the allocation point for a fake branch may be prior to instruction execution (e.g., at the branch address calculation point, in some examples). In certain examples, in a variation of this second cluster balancing approach, fake branch insertion is restricted to blocks that hit in the instruction cache 106. In such examples, another piece of state may be carried with a block from prediction time through to the end of the decode pipeline. In yet another variation, this cluster balancing approach may be approximated by simply tracking that there have been recent instruction cache misses.

In some examples, by employing fake branches when balancing workloads that include long basic blocks (e.g., and microcode flows), and by employing an added field in the BTB 112 in which to indicate a toggle point, processor core 100 relies (e.g., entirely) on the BTB 112 to provide information needed to perform cluster load balancing with near optimal balancing.

Additionally or alternatively, certain examples herein provide for dynamic load balancing in a clustered front-end, e.g., via the disclosed toggle point (e.g., fake branch) control (e.g., insertion) circuitry and methods herein. Certain examples herein provide for optimized dynamic load balancing through filtration of toggle point insertion and/or removal, e.g., additionally or alternatively to controlling the toggling between decode clusters based on a number of uops being delivered within a block exceeding a threshold value. In certain examples, the dynamic load balancing algorithm disclosed herein handles both the insertion of optimal toggle points (e.g., fake branches) by making use of a finite state machine (FSM) along with a data structure (e.g., table) of previously seen candidate toggle points, e.g., additionally or alternatively to controlling the toggling between decode clusters based on a number of uops being delivered within a block exceeding a threshold value.

Figure 2:
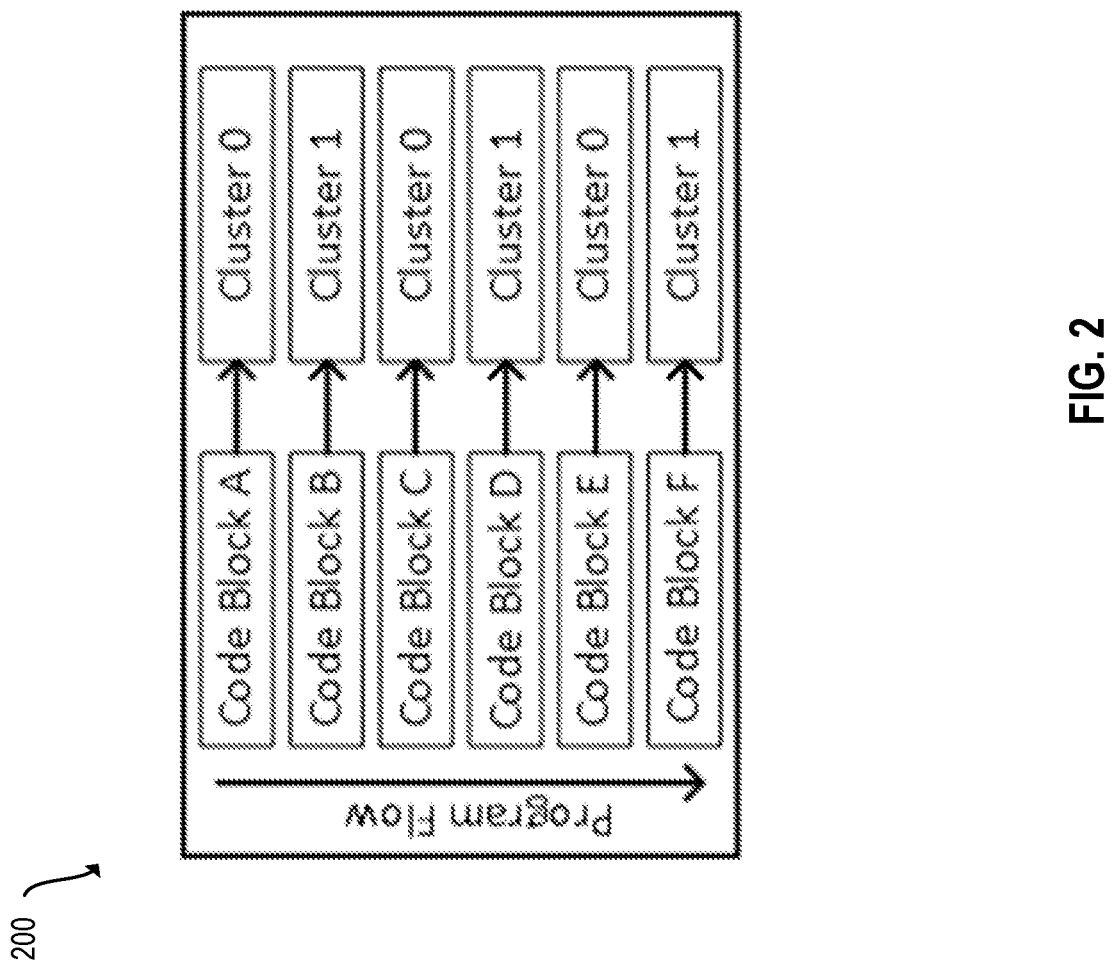
FIG. 2 illustrates an example clustered decode program flow according to examples of the disclosure.

FIG. 2 illustrates an example clustered decode program flow 200 according to examples of the disclosure. For example, with cluster 0 being decode cluster 108A in FIG. 1 and cluster 1 being decode cluster 108B in FIG. 1. Program flow 200 illustrates the (e.g., program) code (e.g., instructions) that is divided into code blocks A-F (e.g., with A being the "oldest" block of code in program order and F being the "youngest" block of code in program order), and each code block assigned to either decode cluster 0 or decoder cluster 1 for decoding.

Referring again to FIG. 1, the processor core 100 (e.g., via the fetch circuit 104 and/or branch predictor 102) may send the blocks of instructions (e.g., blocks A-F in FIG. 2) to a decode cluster, for example, with a first block A of instructions sent to decode cluster 0 108A, a (next in program order, e.g., younger) second block B of instructions sent to decode cluster N 108B, etc. In a two-cluster example, a third (next in program order, e.g., younger) block C of instructions may be sent to the next available decode cluster (e.g., after it has finished the decode of its current block of instructions). In a two-cluster example, a third (next in program order, e.g., younger) block C of instructions may be sent to the next decode cluster (e.g., to decoder cluster 108A in this example). Although two decode clusters 108A-108B are shown, it should be understood that three or more clusters may be utilized (e.g., where "N" is a positive integer greater than one). Examples herein allow toggle point control circuit 120 to determine and insert a toggle point (e.g., fake branch into BTB 112) into a stream of to-be-decoded instructions, e.g., without a human (e.g., programmer) inserting the toggle point into the instruction stream. For example, with a toggle at the end of code block A indicating the next code block B begins.

In certain examples, each decode cluster includes two or more (e.g., superscalar x86) instruction decoders capable of decoding different basic blocks of code out-of-order with respect to each other, for example, with decode cluster 108A including a first decoder circuit 114A (e.g., decoder) and a second decoder circuit 116A (e.g., decoder), and decode cluster 108B including a first decoder circuit 114B (e.g., decoder) and a second decoder circuit 116B (e.g., decoder). In certain examples, one or more of the decode clusters each has three (or more) decoder circuits, e.g., three decode clusters each having three decoder circuits for a nine-wide decode total.

In certain examples, the branch predictor 102 of the processor core 100 divides code into individual blocks (e.g., of a set of contiguous instructions from the program), for example, based on one or more toggle points. In certain examples, the fetch circuit 104 of the processor core 100 divides code into individual blocks (e.g., of a set of contiguous instructions from the program), for example, based on one or more toggle points according to this disclosure. The individual code blocks may then be sent to their respective decode cluster for decoding.

Optionally, processor core 100 includes a (e.g., level one) instruction cache 106, e.g., to cache one or more instructions without having to load them from memory. In certain examples, fetch circuit 104 sends code blocks to their respective decode cluster via instruction cache 106. Instruction cache 106 may include an instruction cache tag and/or instruction translation lookaside buffer (TLB).

In certain examples, once the code blocks are sent to their corresponding decode cluster 108A-108B, each decode cluster begins decoding the code blocks in parallel (e.g., via the parallel decoder circuits therein). In certain examples, the decoders and/or decode clusters operate independently of each other, so the blocks of code can be decoded out-of-order (e.g., out of program order). In certain examples, the allocation circuit 134 is responsible for allocating the operations (e.g., micro-operations) to the execution circuits 136 (e.g., execution units) in the proper program order.

Processor core depicts a first decode cluster 108A with a plurality of decoder circuits 114A-116A in a first set 112A and a second decode cluster 108B with a plurality of decoder circuits 114B-116B in a second set 112B. In certain examples, a (e.g., each) decoder circuit (114A, 116A, 114B, 116B) is to decode a (e.g., macro) instruction into a set of one or more micro-operations that are to be executed (e.g., as a primitive) by an execution circuit(s) 136. In certain examples, a decoder circuit (114A, 116A, 114B, 116B) is to decode certain (e.g., macro) instructions into a corresponding set of one or more micro-operations without utilizing a microcode sequencer 142 (e.g., a microcode sequencer separate from any decode cluster and/or decoder circuit) and/or decode other (e.g., macro) instructions (e.g., complex instruction set computer (CISC) instructions) into a corresponding set of one or more micro-operations by utilizing the microcode sequencer 142 (e.g., the microcode sequencer separate from any decode cluster and/or decoder circuit). In one example, a decoder circuit (114A, 116A, 114B, 116B) is to output a certain number of micro-operation per cycle (e.g., one micro-operation per cycle and/or between one and four micro-operations per cycle). In certain examples, a "micro-coded" instruction generally refers to an instruction where a decode cluster (e.g., set of decoders) requests the microcode sequencer 142 to load the corresponding set of one or more (e.g., plurality of) micro-operations (μops) from the microcode sequencer memory 132 (e.g., read-only memory (ROM)) into the decode pipeline (e.g., into the corresponding instruction decode queue), e.g., instead of producing that instruction's set of one or more micro-operations directly by a decoder circuit. For example, to implement some (e.g., complex) (e.g., x86) instructions, a microcode sequencer 142 is used to divide the instruction into a sequence of smaller (e.g., micro) operations (also referred to as micro-ops or μtops).

In certain examples (e.g., for code being requested for decoding/execution), hardware circuitry (e.g., fetch circuit 104 or instruction cache 106 logic circuitry) is to send to-be-decoded instructions to decode clusters (e.g., a queue thereof) 108A-108B/In certain examples, the hardware circuitry (e.g., fetch circuit 104) within the processor core 100 begins generating a stream of undecoded instructions (e.g., instruction pointer values representing undecoded instructions) in a block of instructions in program order and directing them to a given one of multiple decode clusters 108A-108B in the processor, e.g., until a toggle point is reached to toggle to a different one of the multiple decode clusters 108A-108B.

In certain examples, toggle point control circuit 120 adds and/or removes toggle points (for example, by causing the insertion of an instruction into the instruction stream, e.g., inserting an instruction, that causes a toggle, within instruction cache 106. In certain examples, toggle point control circuit 120 inserts a toggle point (e.g., an instruction marked as a "fake branch") such that when that point (e.g., fake branch) is encountered in the instruction stream (e.g., in program order), the decoding of the instruction stream for the instruction(s) immediately prior to (e.g. or at) the toggle point by one of the multiple decode clusters 108A-108B, is transferred for an instruction immediately after (e.g. or at) the toggle point to a different one of the multiple decode clusters 108A-108B. In certain examples, a toggle point is inserted by marking an existing instruction in an instruction stream as a "fake branch". In certain examples, a toggle point is inserted by inserting an additional (e.g., new) instruction marked as a "fake branch" in an instruction stream.

In certain examples, toggle point control circuit 120 adds and/or removes toggle points within branch predictor 102, e.g., BTB 112 thereof. In certain examples, toggle point control circuit 120 adds a fake branch instruction within branch predictor 102, e.g., BTB 112 thereof, to be used as a toggle point, for example, according to the disclosure herein. In certain examples, toggle point control circuit 120 adds an indication (e.g., to an entry in BTB 112) to switch decode clusters, e.g., by adding an indication (e.g., via coupling 124 between toggle point control circuit 120 and branch predictor 102 (e.g., BTB 112)) to a predicted taken branch with an indication (e.g., metadata data) to indicate a toggle. In certain examples, toggle point control circuit 120 is to (i) determine a location in an instruction stream as a candidate toggle point to switch the sending of the instructions requested for decoding between the first decode cluster and the second decode cluster, (ii) track a number of times a characteristic of multiple previous decodes of the instruction stream is present for the location, and/or (iii) cause insertion of a toggle point at the location, based on the number of times, to switch the sending of the instructions requested for decoding between the first decode cluster and the second decode cluster. In certain examples, the toggling between clusters is based purely on instruction bytes (e.g., where a cache line of instruction bytes may include multiple instructions), e.g., not based on branches, not based on instructions, not based on uops, etc. In certain examples, the toggling between clusters is not based purely on instruction bytes (e.g., where a cache line of instruction bytes may include multiple instructions), e.g., is based on branches, instructions, uops, etc. In certain examples, a processor core (or other component) does not include a split decode unit configured to reassemble instruction bytes into (e.g., variable length instructions which span multiple cache lines) instructions. In certain examples, a hardware processor core (e.g., toggle point control circuit 120) uses a predictor and/or toggle point tracking data structure according to this disclosure, e.g., in contrast to merely toggling based on reading an instruction cache. In certain examples, a toggle in a code (e.g., instruction) stream is inserted (or removed) based on a previous decode of the code (e.g., instruction) stream.

In certain examples, toggle point control circuit 120 maintains (e.g., and includes) a tracking data structure 126, e.g., to determine a location in an instruction stream as a candidate toggle point to switch the sending of the instructions requested for decoding between the first decode cluster and the second decode cluster and/or track a number of times a characteristic of multiple previous decodes of the instruction stream is present for the location. In certain examples, the characteristics include one or any combination of uops, instructions, bytes, or any other characteristics of the (e.g., multiple-times-decoded) instruction stream. In certain examples, the characteristics include one or any combination of the number of uops, the number of instructions, the number of bytes, or any other characteristics of the (e.g., multiple-times-decoded) instruction stream.

In certain examples, toggle point control circuit 120 maintains (e.g., and includes) one or more counters 128 (e.g., a time-out counter discussed herein). In certain examples, tracking data structure 126 is according to the format in FIG. 3.

In certain examples, toggle point control circuit 120 includes a coupling to an (e.g., single) instruction decode queue in each decode cluster, for example, coupling 122A between toggle point control circuit 120 and instruction decode queue 118A and coupling 122B between toggle point control circuit 120 and instruction decode queue 118B.

In certain examples, toggle point control circuit 120 reads (e.g., and includes) one or more thresholds 130, for example, as discussed below and/or in FIG. 4. In certain examples, threshold(s) 130 are values to indicate threshold conditions, for example, a threshold number of uops, instructions, bytes, or any other characteristics of the instruction stream.

After decoding of an instruction into its respective micro-operation(s) (e.g., by decoder circuits or microcode sequencer), in certain examples the micro-operation(s) is stored in an instruction decode queue. In FIG. 1 (e.g., at the end of the decode stage), decode cluster 108A includes instruction decode queue 118A (e.g., instruction queue) that receives respective micro-operations from decoder circuits 114A-116A (e.g., and from a microcode sequencer) and decode cluster 108B includes instruction decode queue 118B (e.g., instruction queue) that receives respective micro-operations from decoder circuits 114B-116B (e.g., and from a microcode sequencer). Optionally, switch 132 is included to couple output(s) of instruction decode queues 118A-118B to input(s) of allocation circuit 134. In certain examples, allocation circuit 134 is to send micro-operations from the instruction decode queues 118A-118B (e.g., in program order) to an execution circuit of execution circuits 136 (for example, based on the type of micro-operation and the type of execution circuit, e.g., integer, vector, floating-point, etc.). In one example, one or more instruction decode queues are loaded out of program order but read in program order. Execution circuits 136 may access storage, e.g., registers 138 and/or data cache 140 (e.g., one or more levels of a cache hierarchy). Once the resultants are generated by the execution circuits 136, a retirement circuit 134 may then retire a corresponding instruction.

Figure 3:
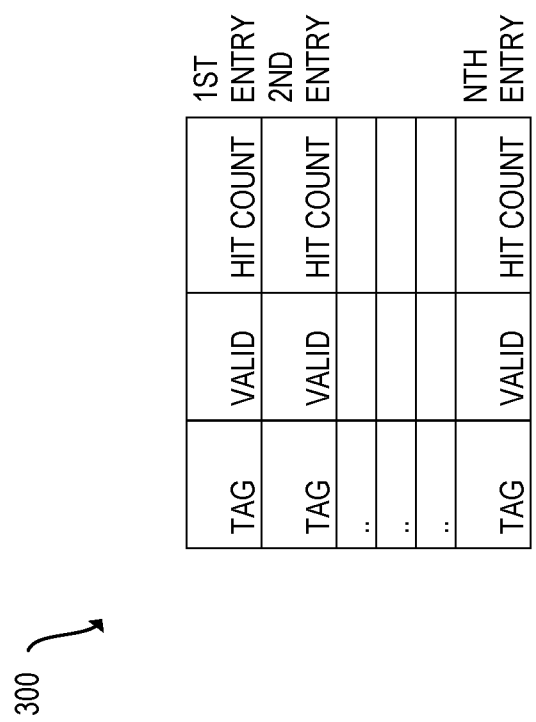
FIG. 3 illustrates an example format of a toggle point tracking data structure according to examples of the disclosure.

FIG. 3 illustrates an example format 300 of a toggle point tracking data structure (e.g., toggle point tracking data structure 126 in FIG. 1) according to examples of the disclosure. In certain examples, toggle point control circuit maintains (e.g., and includes) a tracking data structure according to format 300. In certain examples, the tracking data structure is a table (e.g., a fake branch insertion (FBI) table). In certain examples, a single tracking data structure is shared across all clustered decoders. In certain examples, the tracking data structure is fully associative. The format 300 includes one or a plurality of entries, e.g., where N is any positive integer greater than 1. In one example, N=8.

In certain examples, format 300 for each entry includes a tag field to indicate a candidate point (e.g., instruction) where to insert a toggle point (e.g., fake branch). In certain examples, each tag identifies an instruction that contains the micro-operation (e.g., where an instruction is decoded into multiple micro-operations) that crosses a micro-operation threshold, e.g., as discussed below in reference to FIG. 4. In certain examples, an actual toggle point (e.g., fake branch instruction) is inserted at, or immediately after, the candidate toggle point once the candidate point is determined to be used, e.g., within BTB 112.

In certain examples, format 300 for each entry includes a valid field to indicate that an entry is valid or invalid, e.g., where an invalid entry (e.g., marked with an INVALID indication in the second column of an entry of) in toggle point tracking data structure is selected first for allocation. In certain examples, if all the entries are valid then a least-recently-used (LRU) policy is followed to replace the least recently used entry (e.g., based on a timer for that entry), e.g., a LRU policy along with the "use-once deallocate policy" selects an entry to be replaced.

In certain examples, format 300 for each entry includes a hit count field to indicate the number of times that candidate toggle point (e.g., candidate instruction) is encountered during previous decode of any instruction stream. Example usage of the hit count field is described in further detail in reference to FIG. 4.

In certain examples, once a candidate point is determined to be used as a toggle point, the toggle point control circuit 120 is to cause the indication of the toggle point to be activated, e.g., by inserting a corresponding fake branch (e.g., that causes a toggle) into BTB 112.

Figure 4:
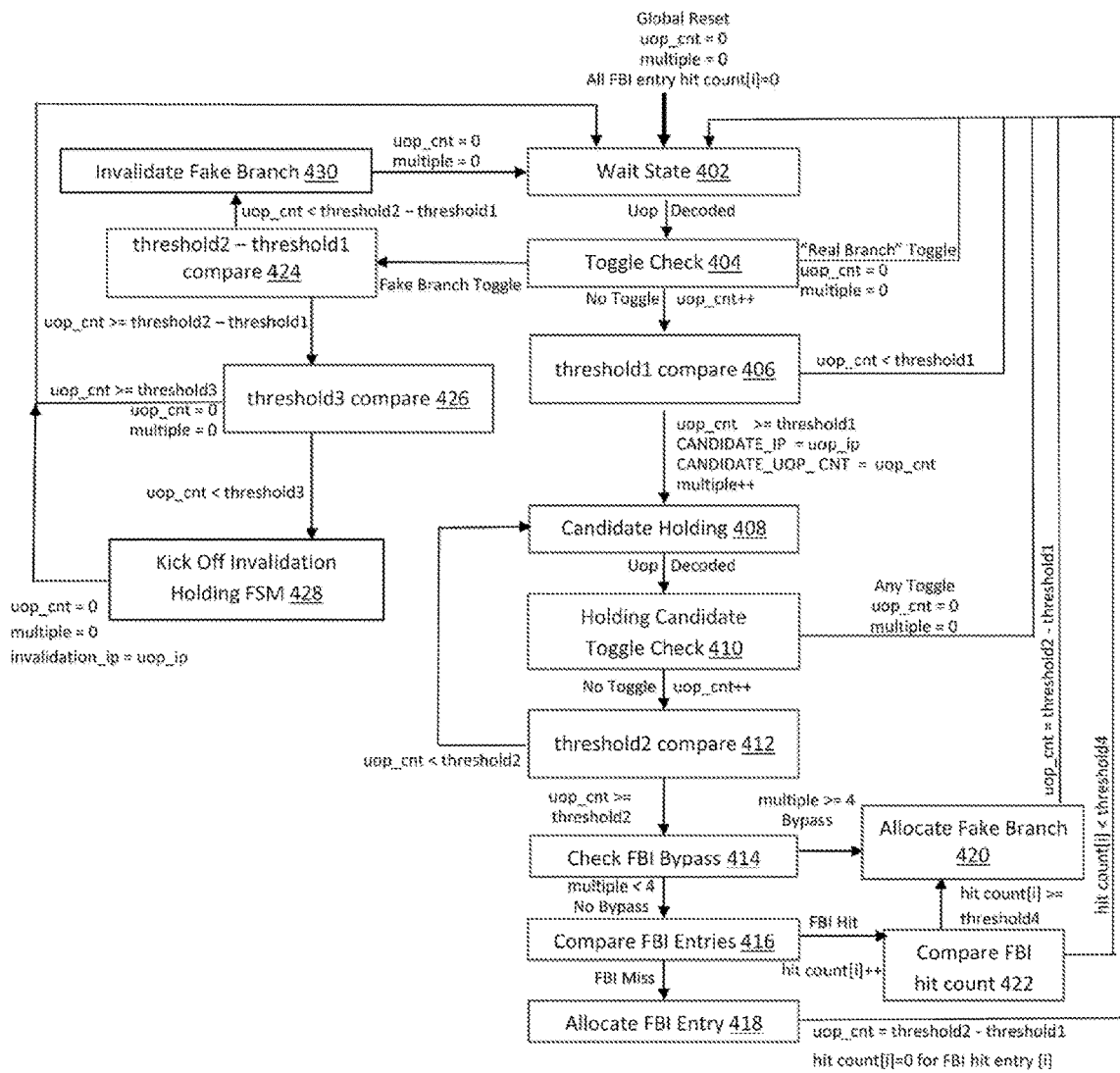
FIG. 4 illustrates a flow diagram for dynamic load balancing according to examples of the disclosure.

FIG. 4 illustrates a flow diagram 400 for dynamic load balancing according to examples of the disclosure. Although the term fake branch insertion (FBI) table is used in FIG. 4, it should be understood that other data structures may be utilized, e.g., a toggle point tracking data structure. In certain examples, toggle point control circuit 120 operates according to flow diagram 400.

In certain examples, the flow diagram 400 (e.g., algorithm) is based on counting the number of uops that comprise a block of sequential (e.g., x86) instructions. This may be referred to as the current "uop_cnt". In certain examples, the micro-operation count (uop_cnt) is the number of decoded micro-operations since the last actual toggle or toggle candidate was encountered. In certain examples, flow diagram (e.g., algorithm) compares against the current micro-operation count (uop_cnt), certain thresholds are tunable (e.g., may be varied), for example, threshold1, threshold2, threshold3, and threshold4 (e.g., as stored into threshold(s) 130 in FIG. 1).

In certain examples, threshold1 indicates a threshold number (e.g., 24) of decoded micro-operations that have been seen since a toggle, e.g., such that threshold1 is used to determine a candidate location for the insertion of a toggle point (e.g., fake branch), for example, a toggle point (e.g., real branch) that is not already within the instruction stream.

In certain examples, threshold2 indicates a different threshold number (e.g., 32) of decoded micro-operations that have been seen after a toggle, for example, such that threshold2 is used to avoid inserting a toggle (e.g., fake branch) when the code stream already has another toggle in a future number of micro-operations, e.g., if a toggle occurs within threshold2 number of uops, the candidate will be dropped and will not allocate into the toggle point tracking data structure.

In certain examples, threshold3 indicates a threshold number (e.g., 16) of decoded micro-operations, e.g., such that threshold3 is used to determine when a previously inserted fake branch should be invalidated (e.g., invalidated in the prediction structure (e.g., BTB)). For example, for a check if the micro-operation count (uop_cnt) leading to the fake branch is below the difference between threshold2 and threshold1 (e.g., 8 in the above example), if so, the fake branch can be removed immediately (e.g., from the prediction structure (e.g., BTB)), and if above this difference but below threshold3, it may be able to be removed.

In certain examples, a fake branch that is already in the prediction structure (e.g., in the BTB as a fake branch) is invalidated if the code path has changed such that it is no longer efficient, e.g., there is no interplay with the toggle point tracking data structure (e.g., FBI) on this path. In certain examples, a tracking entry (e.g., "FBI" entry) is allocated (or deallocated (e.g., invalidated)) only when there are not any toggle point in that section of code and the system (e.g., core) has decoded enough uops that it is desirable to insert a new fake branch. In certain examples, the toggle point tracking data structure (e.g., FBI) is a holding area to track candidate locations where adding a fake branch should help with load balancing, but want to confirm that same/similar situation happens in the decoder (s) multiple times (in one implementation, the multiple is 2 times unless a bypass case which is 1, but could be any values) before allowing that candidate to allocate into the prediction structure (e.g., BTB) from the toggle point tracking data structure (e.g., FBI). In certain examples, if a candidate (e.g., branch) hits in the toggle point tracking data structure (e.g., FBI) and the multiple requirement is met, that candidate (e.g., location) is inserted into the prediction structure (e.g., BTB), e.g., and the corresponding entry is deallocated from the toggle point tracking data structure (e.g., FBI) since it no longer needs to be held (e.g., it is an actual toggle then and not a candidate toggle).

In certain examples, threshold4 indicates a threshold number (e.g., 1 or 2) of hits for an entry in toggle point tracking data structure to be promoted from a candidate location to an actual location of a toggle point, e.g., where the candidate location is promoted to the BTB as a fake branch.

In certain examples, global reset is to clear all the tracking data, e.g., clear a toggle point tracking data structure (e.g., but not the thresholds).

In certain examples, "multiple" value is the total number of toggle candidates seen without any toggle. In certain examples, once the number of toggle candidates identified crosses the threshold for "multiple" (e.g., in FIG. 4 this is depicted as being 4, which implies total number of instructions seen without any toggle crosses 4*threshold1 or 4*24 assuming an example where threshold1=24) then the toggle point tracking data structure (e.g., FBI) insertion can be skipped (e.g., "FBI bypass") and the toggle candidate is promoted directly to being a toggle point (e.g., fake branch), e.g., inserted into the prediction structure (e.g., BTB).

In certain examples, "multiple" value is the total number of micro-operations (e.g., the number indicated by the "threshold1" value) seen without any toggle. An example "threshold1" value is 24, although it can be any number in other examples.

Figure 5:
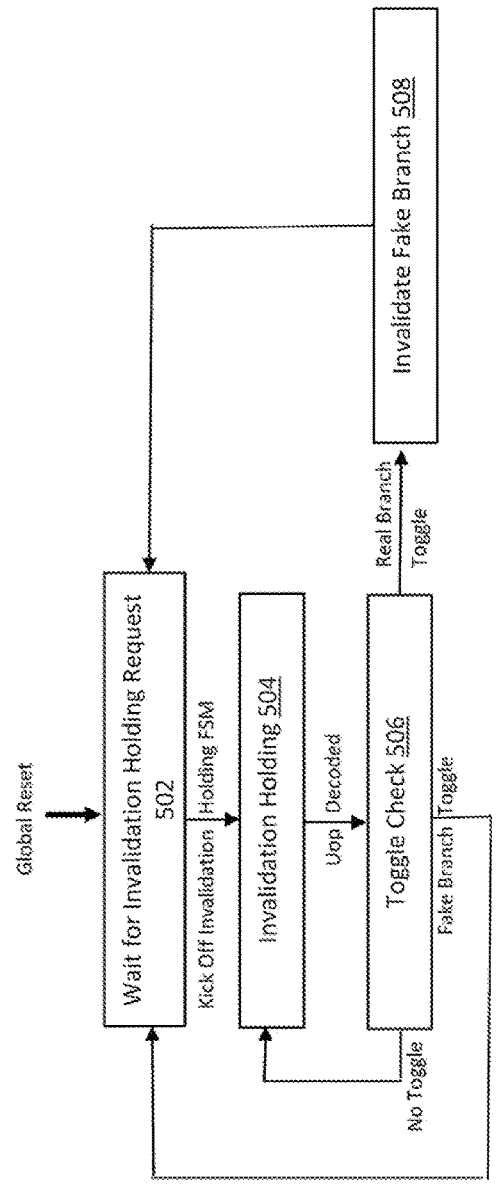
FIG. 5 illustrates a flow diagram for an invalidation holding finite state machine according to examples of the disclosure.

In certain examples, operations for flow diagram 400 include a wait state at 402, e.g., to wait for a micro-operation (uop) to be decoded (e.g., to show up in an instruction decode queue), a toggle check at 404 to determine if the micro-operation is already a toggle-causing instruction (e.g., micro-operation thereof), (i) if so and a "real" toggle (e.g., a real "taken" branch micro-operation or corresponding macro-instruction) then clear the uop_cnt and multiple counters and proceed back to wait state 402, (ii) if so and a "fake" toggle (e.g., fake "taken" branch micro-operation or corresponding macro-instruction) then to proceed to comparison 424 where the depicted thresholds are compared and proceed to either invalidate the fake branch at 430 from the BTB or to proceed to comparison 426 (for example, and then kick off the invalidation holding finite state machine (FSM) at 428 if the depicted condition(s) are met, e.g., as shown in FIG. 5), and (iii) if not a toggle-causing instruction (e.g., micro-operation thereof), proceeding to threshold1 comparison at 406, candidate holding 408 (e.g., to check additional micro-operations that have been decoded), holding candidate toggle check at 410 (e.g., to check if the additional micro-operation is a toggle), threshold2 comparison at 412, checking the toggle point tracking data structure (e.g., FBI) bypass at 414, comparing the toggle point tracking data structure (e.g., FBI) entries at 416, and allocating an entry in toggle point tracking data structure (e.g., FBI) at 418. In certain examples, a fake branch is allocated at 420. In certain examples, a comparison of the hit count (e.g., as shown in FIG. 3) is performed for an entry at 422.

In certain examples (e.g., under normal situations) once the micro-operation count (uop_cnt) reaches threshold1, the candidate location for the insertion of a toggle (e.g., fake branch) is chosen. In certain examples, this candidate location may not be fully static, however, as there may be restrictions based on instruction type, presence of long micro-code (e.g., read-only memory) flow (e.g., from microcode sequencer)), or other hardware-based restrictions that could require that the instruction (e.g., micro-operation) precisely at threshold1 be disallowed from being a candidate. To deal with this, in certain examples the eventual candidate captures instruction pointer (IP) information as well as the micro-operation count (uop_cnt) to be stored into a toggle point tracking data structure (e.g., table). In some examples, this table is referred to as the fake branch insertion table ("FBI"). In certain examples, if a uop (e.g., candidate for a toggle point) with the matching tag (e.g., hashed IP bits) and micro-operation count (uop_cnt) is seen again, it hits in the toggle point tracking data structure (e.g., FBI table). In certain examples, if the candidate's entry in the toggle point tracking data structure (e.g., FBI table) has been hit a sufficient number of times (e.g., hit count is greater than or equal to threshold4), the entry is deallocated from the toggle point tracking data structure (e.g., FBI table) and the candidate location is promoted as an actual toggle point (e.g., by promoting that entry to the BTB as a fake branch). In certain examples, the hit count threshold4 is selectable to different values. To avoid inserting a fake branch when the code stream already has another toggle in the (e.g., very near) future, in certain examples if a toggle is detected within a threshold2 number of uops, the candidate will be dropped and will not allocate into the toggle point tracking data structure (e.g., FBI table).

In certain examples, it may be desirable to implement a toggle point tracking data structure (e.g., FBI table) of smaller size, e.g., when there is a very long sequence of 2000 uops between taken branches it may be desirable to insert toggle points every 20 uops, but this may utilize a toggle point tracking data structure (e.g., FBI table) that is at least 2000/20 deep i.e., 100 entries, because any smaller than that, and capacity eviction might result in no toggle insertions at all.

To enable a small/dense toggle point tracking data structure (e.g., FBI table) while handling long sequences, certain examples herein utilize a toggle point tracking data structure (e.g., FBI table) bypass (e.g., "FBI bypass") for situations where there are no branches at all in the sequence of instructions, e.g., to allow a chance for an entry from the toggle point tracking data structure (e.g., FBI table) a chance to be promoted from a candidate toggle point to an actual toggle point (e.g., to be promoted from the toggle point tracking data structure into the BTB as a fake branch). For example, as seen in certain long unrolled single-instruction multiple data (SIMD) and/or floating-point (FP) compute. In certain examples, when the current micro-operation count (uop_cnt) exceeds a multiple of threshold1 without any toggles, toggle point tracking data structure (e.g., FBI table) is bypassed. In FIG. 4 this is depicted as being 4, but it should be understood that other values may be utilized (e.g., configurable in the hardware). In certain examples, there are other conditions (e.g., certain long complex instruction set computer (CISC) flows) under which toggle point tracking data structure (e.g., FBI table) bypass is also enabled. In certain examples, toggle point tracking data structure (e.g., FBI table) bypass mode is disabled after a true toggle is seen again or a reset condition has occurred.

In certain examples, toggle point tracking data structure (e.g., FBI table) bypass solves the majority of cases that trigger the need for a very large table, however there may still be a still capacity eviction cases which can overwhelm any finite toggle point tracking data structure (e.g., FBI table). To augment toggle point tracking data structure (e.g., FBI table) bypass and enable a smaller toggle point tracking data structure (e.g., FBI table), certain (e.g., but not all) (e.g., 2) entries of the toggle point tracking data structure (e.g., FBI table) have a "use-once deallocate policy" in certain examples, e.g., such that for those entries, if "valid", cannot be overwritten until a timer (e.g., a time-out counter) overflows or they are deallocated due to toggle (e.g., fake branch) insertion. In certain examples, this time out mechanism is built via a multiple (e.g., 6) bit counter tracking total toggle point tracking data structure (e.g., FBI table) entry allocations. In certain examples, when the counter overflows (e.g., 63 to 0), those "special" entries are allowed to be LRU replaced again.

In certain examples, a simple code stream with very predictable and static path lengths will come to rest with all fake branches located at threshold1 distances from the previous toggle points. However, code is often dynamic and, therefore, toggles (e.g., fake branches) inserted during one phase of decode and/or execution may not be well positioned during subsequent phases. For this situation, certain examples herein utilize logic that detects when previously inserted toggles (e.g., fake branches) should be invalidated, e.g., in the BTB. In certain examples, this is (or is not) detecting anytime a toggle (e.g., fake branch) is found below threshold2 minus threshold1.

In certain examples, if numerous (e.g., constant) adjustment of inserted toggles (e.g., fake branch locations) are detected, a toggle point control circuit instead keeps a single (e.g., poorly positioned) toggle (e.g., fake branch) in a long stream of otherwise correctly placed toggles (e.g., fake branches). In certain examples, this includes checking if the micro-operation count (uop_cnt) leading to the fake branch is below the difference between threshold2 and threshold1 (e.g., 8 uops). In certain examples, if so, it can be removed immediately. In certain examples, if above this difference but below threshold3 (e.g., 16 uops) it may be able to be removed. In certain examples, the toggle (e.g., fake branch) is not removed if the subsequent toggle is also an inserted toggle (e.g., "fake" branch). An example of an invalidation (e.g., as performed by a toggle point control circuit) is depicted in FIG. 5.

FIG. 5 illustrates a flow diagram 500 for an invalidation holding finite state machine according to examples of the disclosure. Depicted flow diagram 500 includes waiting for an invalidation holding request 502, and when received (e.g., at 428 in FIG. 4), holding the invalidation request at 504 to check if the next toggle encountered is real (e.g., real branch) and if yes, invalidating that fake branch from the prediction structure (e.g., BTB) at 508, and if no, not invalidating the fake branch in the prediction structure (e.g., BTB) (and proceeding back to wait at 502).

FIG. 6 is a flow diagram illustrating operations 600 for inserting a toggle point to switch the decoding of an instruction stream between a plurality of decode clusters according to examples of the disclosure. Some or all of the operations 600 (or other processes described herein, or variations, and/or combinations thereof) are performed under the control of a toggle point control circuit 120 (e.g., of a processor core 100).

The operations 600 include, at block 602, receiving an instruction stream requested for decode by a hardware processor core comprising a first decode cluster having a plurality of decoder circuits and a second decode cluster having a plurality of decoder circuits. The operations 600 further include, at block 604, determining, by a toggle point control circuit of the hardware processor core, a location in the instruction stream as a candidate toggle point to switch sending of the instructions requested for decoding between the first decode cluster and the second decode cluster. The operations 600 further include, at block 606, tracking, by the toggle point control circuit, a number of times a characteristic of multiple previous decodes of the instruction stream is present for the location. The operations 600 further include, at block 608, inserting a toggle point at the location, based on the number of times, to switch the sending of the instructions requested for decoding between the first decode cluster and the second decode cluster Exemplary architectures, systems, etc. that the above may be used in are detailed below.

At least some examples of the disclosed technologies can be described in view of the following:

Example 1. A hardware processor core comprising:
a first decode cluster comprising a plurality of decoder circuits;
a second decode cluster comprising a plurality of decoder circuits; and
a toggle point control circuit to toggle between sending instructions requested for decoding between the first decode cluster and the second decode cluster, wherein the toggle point control circuit is to:
determine a location in an instruction stream as a candidate toggle point to switch the sending of the instructions requested for decoding between the first decode cluster and the second decode cluster,
track a number of times a characteristic of multiple previous decodes of the instruction stream is present for the location, and
cause insertion of a toggle point at the location, based on the number of times, to switch the sending of the instructions requested for decoding between the first decode cluster and the second decode cluster.

Example 2. The hardware processor core of example 1, wherein the characteristic is a number of micro-operations decoded from the instruction stream before the location and after an immediately previous switch of decoding of the instruction stream between the first decode cluster and the second decode cluster.

Example 3. The hardware processor core of example 1, wherein the characteristic is a number of macro-instructions decoded from the instruction stream before the location and after an immediately previous switch of decoding of the instruction stream between the first decode cluster and the second decode cluster.

Example 4. The hardware processor core of example 1, wherein the insertion of the toggle point comprises insertion of a branch instruction in a branch target buffer of the hardware processor core.

Example 5. The hardware processor core of example 1, wherein the toggle point control circuit is to further remove the location as the candidate toggle point when an existing toggle point is encountered within a threshold number of instructions after the location in a subsequent decode of the instruction stream.

Example 6. The hardware processor core of example 1, wherein the characteristic is a number of micro-operations decoded from the instruction stream before the location. As a further example, in certain examples, when the number of micro-operations crosses a certain threshold (e.g., as depicted in FIG. 4 at 414 set to value of 4) without any toggles, it will then start bypassing the FBI (e.g., and a fake branch will be allocated in the BTB).

Example 7. The hardware processor core of example 1, wherein the toggle point control circuit comprises a timer and is to stop tracking the number of times the characteristic of multiple previous decodes of the instruction stream is present for the location after a tracking time from the timer exceeds a threshold time.

Example 8. The hardware processor core of example 1, wherein the toggle point control circuit is to determine a plurality of candidate toggle points and track a corresponding number of times a respective characteristic of multiple previous decodes of the instruction stream is present for each respective location.

Example 9. A method comprising:
receiving an instruction stream requested for decode by a hardware processor core comprising a first decode cluster having a plurality of decoder circuits and a second decode cluster having a plurality of decoder circuits;
determining, by a toggle point control circuit of the hardware processor core, a location in the instruction stream as a candidate toggle point to switch sending of the instructions requested for decoding between the first decode cluster and the second decode cluster;
tracking, by the toggle point control circuit, a number of times a characteristic of multiple previous decodes of the instruction stream is present for the location; and
inserting a toggle point at the location, based on the number of times, to switch the sending of the instructions requested for decoding between the first decode cluster and the second decode cluster.

Example 10. The method of example 9, wherein the characteristic is a number of micro-operations decoded from the instruction stream before the location and after an immediately previous switch of decoding of the instruction stream between the first decode cluster and the second decode cluster.

Example 11. The method of example 9, wherein the characteristic is a number of macro-instructions decoded from the instruction stream before the location and after an immediately previous switch of decoding of the instruction stream between the first decode cluster and the second decode cluster.

Example 12. The method of example 9, wherein the insertion of the toggle point comprises inserting a branch instruction in a branch target buffer of the hardware processor core.

Example 13. The method of example 9, further comprising removing the location as the candidate toggle point when an existing toggle point is encountered within a threshold number of instructions after the location in a subsequent decode of the instruction stream.

Example 14. The method of example 9, wherein the characteristic is a number of micro-operations decoded from the instruction stream before the location.

Example 15. The method of example 9, further comprising stopping the tracking of the number of times the characteristic of multiple previous decodes of the instruction stream is present for the location after a tracking time exceeds a threshold time.

Example 16. The method of example 9, wherein the determining comprises determining a plurality of candidate toggle points and the tracking comprises tracking a corresponding number of times a respective characteristic of multiple previous decodes of the instruction stream is present for each respective location.

Example 17. An apparatus comprising:
a memory to store instructions;
a first decode cluster comprising a plurality of decoder circuits;
a second decode cluster comprising a plurality of decoder circuits; and
a toggle point control circuit to toggle between sending the instructions requested for decoding between the first decode cluster and the second decode cluster, wherein the toggle point control circuit is to:
determine a location in an instruction stream as a candidate toggle point to switch the sending of the instructions requested for decoding between the first decode cluster and the second decode cluster,
track a number of times a characteristic of multiple previous decodes of the instruction stream is present for the location, and
cause insertion of a toggle point at the location, based on the number of times, to switch the sending of the instructions requested for decoding between the first decode cluster and the second decode cluster.

Example 18. The apparatus of example 17, wherein the characteristic is a number of micro-operations decoded from the instruction stream before the location and after an immediately previous switch of decoding of the instruction stream between the first decode cluster and the second decode cluster.

Example 19. The apparatus of example 17, wherein the characteristic is a number of macro-instructions decoded from the instruction stream before the location and after an immediately previous switch of decoding of the instruction stream between the first decode cluster and the second decode cluster.

Example 20. The apparatus of example 17, wherein the insertion of the toggle point comprises insertion of a branch instruction in a branch target buffer.

Example 21. The apparatus of example 17, wherein the toggle point control circuit is to further remove the location as the candidate toggle point when an existing toggle point is encountered within a threshold number of instructions after the location in a subsequent decode of the instruction stream.

Example 22. The apparatus of example 17, wherein the characteristic is a number of micro-operations decoded from the instruction stream before the location.

Example 23. The apparatus of example 17, wherein the toggle point control circuit comprises a timer and is to stop tracking the number of times the characteristic of multiple previous decodes of the instruction stream is present for the location after a tracking time from the timer exceeds a threshold time.

Example 24. The apparatus of example 17, wherein the toggle point control circuit is to determine a plurality of candidate toggle points and track a corresponding number of times a respective characteristic of multiple previous decodes of the instruction stream is present for each respective location.

In yet another example, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary graphics processors are described next. Followed by exemplary core architectures, and descriptions of exemplary processors and computer architectures.

Exemplary Core Architectures

In-Order and Out-of-order Core Block Diagram

Figure 7A:
FIG. 7A is a block diagram illustrating both an exemplary in-order pipeline and an exemplary register renaming, out-of-order issue/execution pipeline according to examples of the disclosure.
Figure 7B:
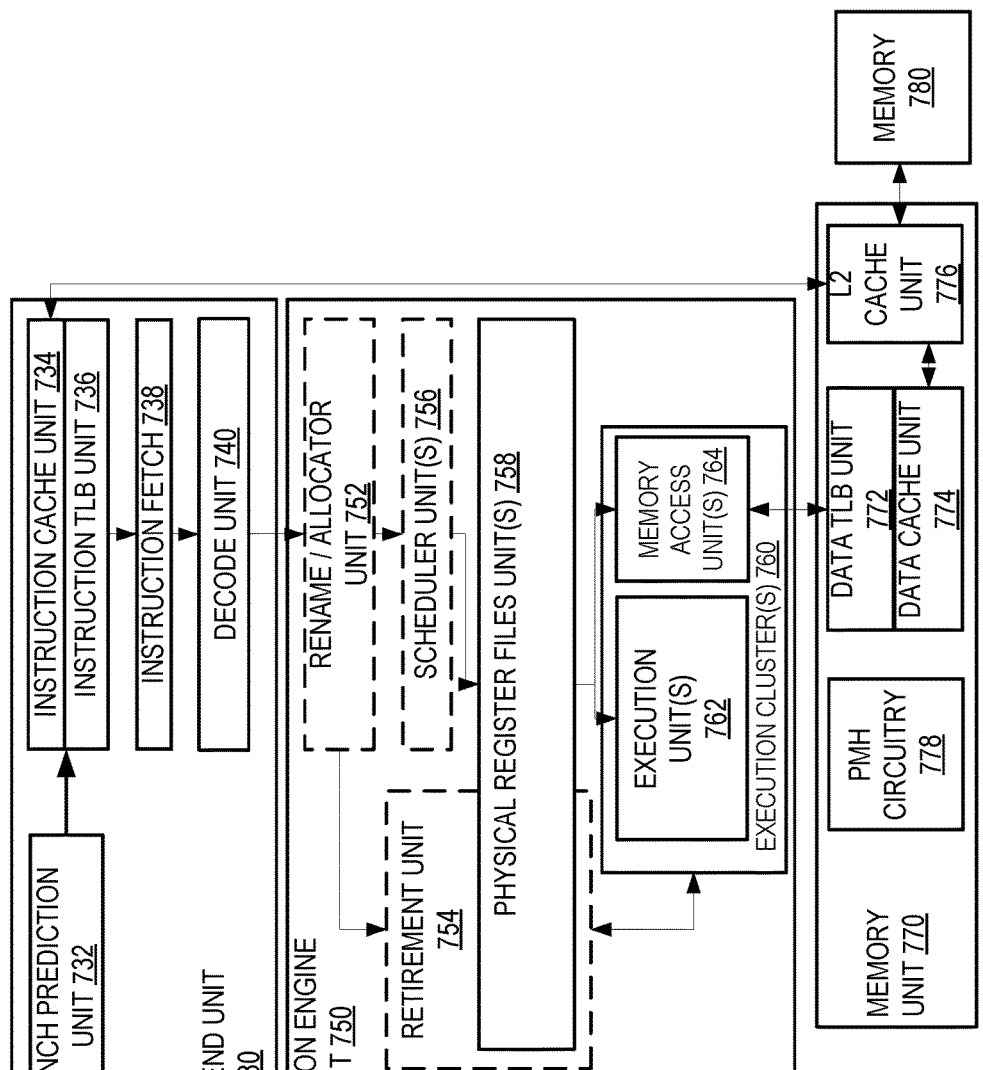
FIG. 7B is a block diagram illustrating both an exemplary example of an in-order architecture core and an exemplary register renaming, out-of-order issue/execution architecture core to be included in a processor according to examples of the disclosure.

FIG. 7A is a block diagram illustrating both an exemplary in-order pipeline and an exemplary register renaming, out-of-order issue/execution pipeline according to examples of the disclosure. FIG. 7B is a block diagram illustrating both an exemplary example of an in-order architecture core and an exemplary register renaming, out-of-order issue/execution architecture core to be included in a processor according to examples of the disclosure. The solid lined boxes in FIGS. 7A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

FIG. 7B shows processor core 790 including a front-end unit 730 coupled to an execution engine unit 750, and both are coupled to a memory unit 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front-end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740 (e.g., a plurality of decode clusters in certain examples). The decode unit 740 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one example, the core 790 includes a microcode ROM or other medium that stores microcode for certain macro-instructions (e.g., in decode unit 740 or otherwise within the front-end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one example, the physical register file(s) unit 758 comprises a vector registers unit, a write mask registers unit, and a scalar registers unit. These register units may provide architectural vector registers, vector mask registers, and general-purpose registers. The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some examples may include a number of execution units dedicated to specific functions or sets of functions, other examples may include only one execution unit or multiple execution units that all perform all functions. The scheduler unit(s) 756, physical register file(s) unit(s) 758, and execution cluster(s) 760 are shown as being possibly plural because certain examples create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain examples are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary example, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels of cache and eventually to a main memory.

In certain examples, a prefetch circuit 778 is included to prefetch data, for example, to predict access addresses and bring the data for those addresses into a cache or caches (e.g., from memory 780).

By way of example, the exemplary register renaming, out-of-order issue/execution core architecture may implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one example, the core 790 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated example of the processor also includes separate instruction and data cache units 734/774 and a shared L2 cache unit 776, alternative examples may have a single internal cache for both instructions and data, such as, for example, a Level 1 (L1) internal cache, or multiple levels of internal cache. In some examples, the system may include a combination of an internal cache and an external cache that is external to the core and/or the processor. Alternatively, all of the cache may be external to the core and/or the processor.

Specific Exemplary In-Order Core Architecture

Figure 8B:
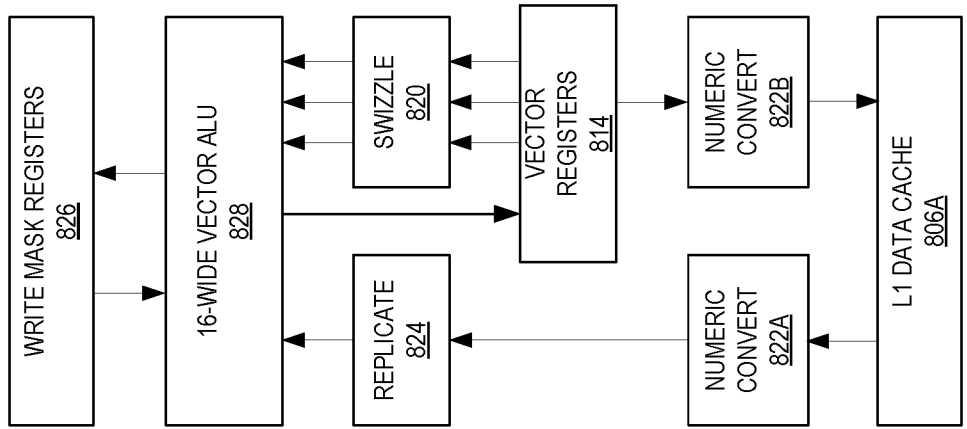
FIG. 8B is an expanded view of part of the processor core in FIG. 8A according to examples of the disclosure.
Figure 8A:
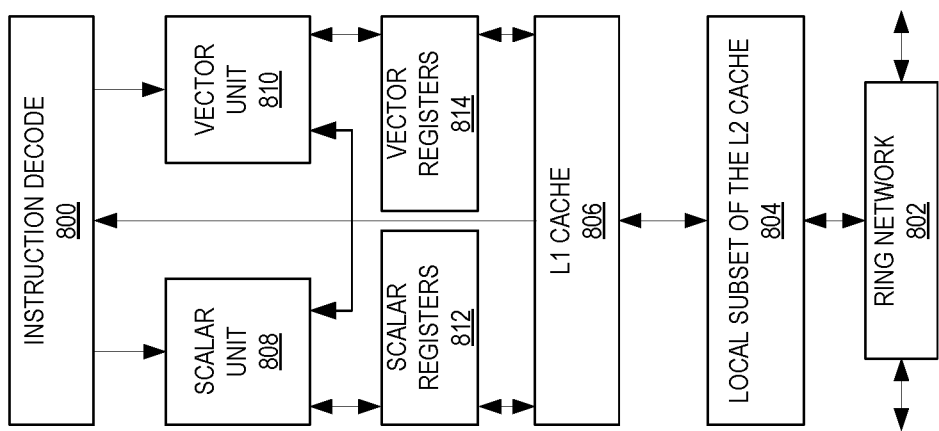
FIG. 8A is a block diagram of a single processor core, along with its connection to the on-die interconnect network and with its local subset of the Level 2 (L2) cache, according to examples of the disclosure.

FIGS. 8A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 8A is a block diagram of a single processor core, along with its connection to the on-die interconnect network 802 and with its local subset of the Level 2 (L2) cache 804, according to examples of the disclosure. In one example, an instruction decode unit 800 supports the x86 instruction set with a packed data instruction set extension. An L1 cache 806 allows low-latency accesses to cache memory into the scalar and vector units. While in one example (to simplify the design), a scalar unit 808 and a vector unit 810 use separate register sets (respectively, scalar registers 812 and vector registers 814) and data transferred between them is written to memory and then read back in from a level 1 (L1) cache 806, alternative examples of the disclosure may use a different approach (e.g., use a single register set or include a communication path that allow data to be transferred between the two register files without being written and read back).

The local subset of the L2 cache 804 is part of a global L2 cache that is divided into separate local subsets, one per processor core. Each processor core has a direct access path to its own local subset of the L2 cache 804. Data read by a processor core is stored in its L2 cache subset 804 and can be accessed quickly, in parallel with other processor cores accessing their own local L2 cache subsets. Data written by a processor core is stored in its own L2 cache subset 804 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 8B is an expanded view of part of the processor core in FIG. 8A according to examples of the disclosure. FIG. 8B includes an L1 data cache 806A part of the L1 cache 804, as well as more detail regarding the vector unit 810 and the vector registers 814. Specifically, the vector unit 810 is a 16-wide vector processing unit (VPU) (see the 16-wide ALU 828), which executes one or more of integer, single-precision float, and double-precision float instructions. The VPU supports swizzling the register inputs with swizzle unit 820, numeric conversion with numeric convert units 822A-B, and replication with replication unit 824 on the memory input. Write mask registers 826 allow predicating resulting vector writes.

Figure 9:
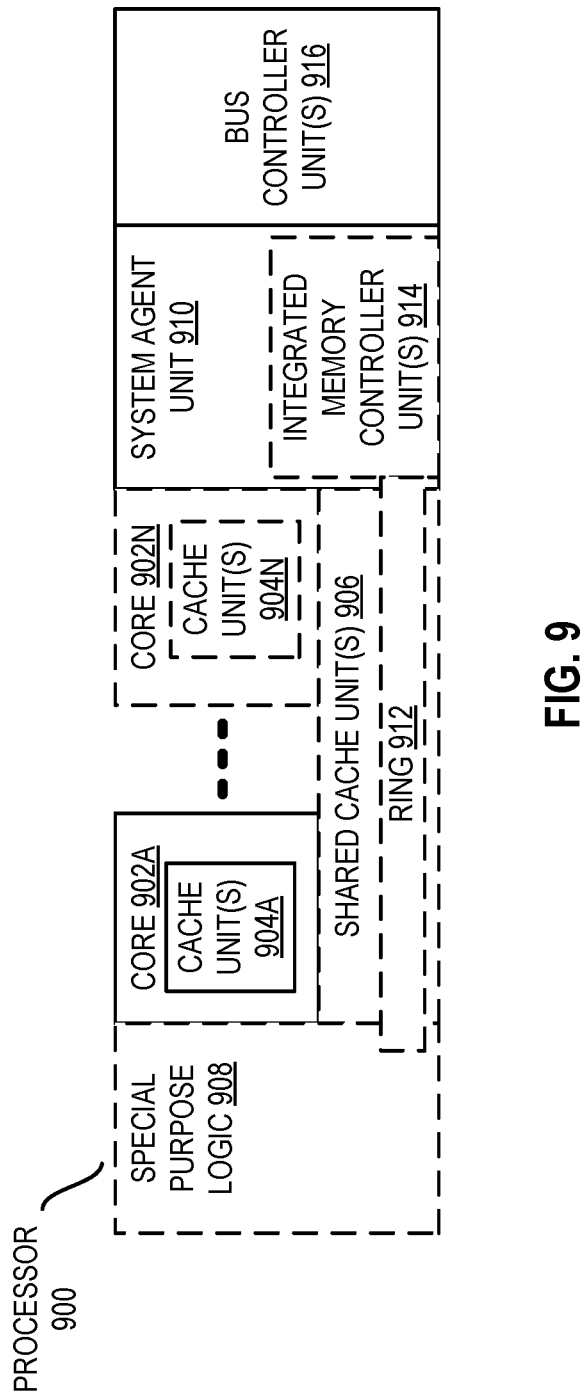
FIG. 9 is a block diagram of a processor that may have more than one core, may have an integrated memory controller, and may have integrated graphics according to examples of the disclosure.

FIG. 9 is a block diagram of a processor 900 that may have more than one core, may have an integrated memory controller, and may have integrated graphics according to examples of the disclosure. The solid lined boxes in FIG. 9 illustrate a processor 900 with a single core 902A, a system agent 910, a set of one or more bus controller units 916, while the optional addition of the dashed lined boxes illustrates an alternative processor 900 with multiple cores 902A-N, a set of one or more integrated memory controller unit(s) 914 in the system agent unit 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor, or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof. While in one example a ring-based interconnect unit 912 interconnects the integrated graphics logic 908, the set of shared cache units 906, and the system agent unit 910/integrated memory controller unit(s) 914, alternative examples may use any number of well-known techniques for interconnecting such units. In one example, coherency is maintained between one or more cache units 906 and cores 902-A-N.

In some examples, one or more of the cores 902A-N are capable of multi-threading. The system agent 910 includes those components coordinating and operating cores 902A-N. The system agent unit 910 may include for example a power control unit (PCU) and a display unit. The PCU may be or include logic and components needed for regulating the power state of the cores 902A-N and the integrated graphics logic 908. The display unit is for driving one or more externally connected displays.

The cores 902A-N may be homogenous or heterogeneous in terms of architecture instruction set; that is, two or more of the cores 902A-N may be capable of execution the same instruction set, while others may be capable of executing only a subset of that instruction set or a different instruction set.

Exemplary Computer Architectures

FIGS. 10-13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, handheld devices, and various other electronic devices, are also suitable. In general, a huge variety of systems or electronic devices capable of incorporating a processor and/or other execution logic as disclosed herein are generally suitable.

Figure 10:
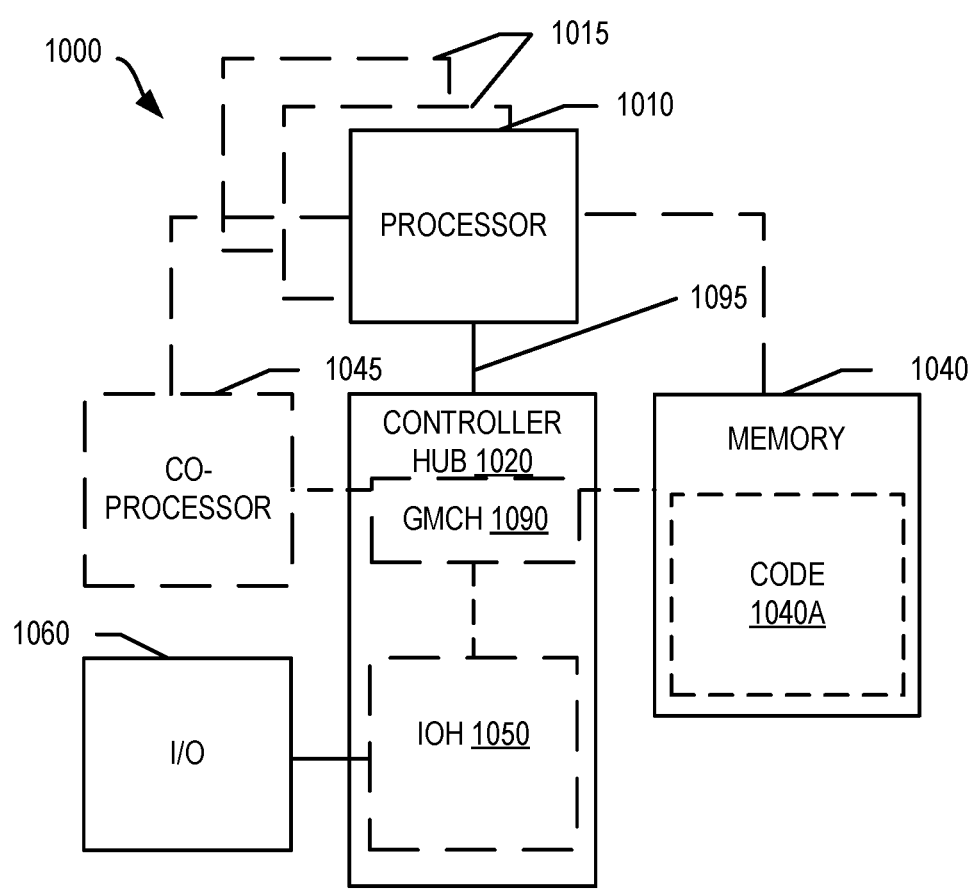
FIG. 10 is a block diagram of a system in accordance with one example of the present disclosure.

Referring now to FIG. 10, shown is a block diagram of a system 1000 in accordance with one example of the present disclosure. The system 1000 may include one or more processors 1010, 1015, which are coupled to a controller hub 1020. In one example the controller hub 1020 includes a graphics memory controller hub (GMCH) 1090 and an Input/Output Hub (IOH) 1050 (which may be on separate chips); the GMCH 1090 includes memory and graphics controllers to which are coupled memory 1040 and a coprocessor 1045; the IOH 1050 is couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 in a single chip with the IOH 1050. Memory 1040 may include code 1040A, for example, to store code that when executed causes a processor to perform any method of this disclosure.

The optional nature of additional processors 1015 is denoted in FIG. 10 with broken lines. Each processor 1010, 1015 may include one or more of the processing cores described herein and may be some version of the processor 900.

The memory 1040 may be, for example, dynamic random-access memory (DRAM), phase change memory (PCM), or a combination of the two. For at least one example, the controller hub 1020 communicates with the processor(s) 1010, 1015 via a multi-drop bus, such as a frontside bus (FSB), point-to-point interface such as Quickpath Interconnect (QPI), or similar connection 1095.

In one example, the coprocessor 1045 is a special-purpose processor, such as, for example, a high-throughput MIC processor, a network or communication processor, compression engine, graphics processor, GPGPU, embedded processor, or the like. In one example, controller hub 1020 may include an integrated graphics accelerator.

There can be a variety of differences between the physical resources 1010, 1015 in terms of a spectrum of metrics of merit including architectural, microarchitectural, thermal, power consumption characteristics, and the like.

In one example, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

Figure 11:
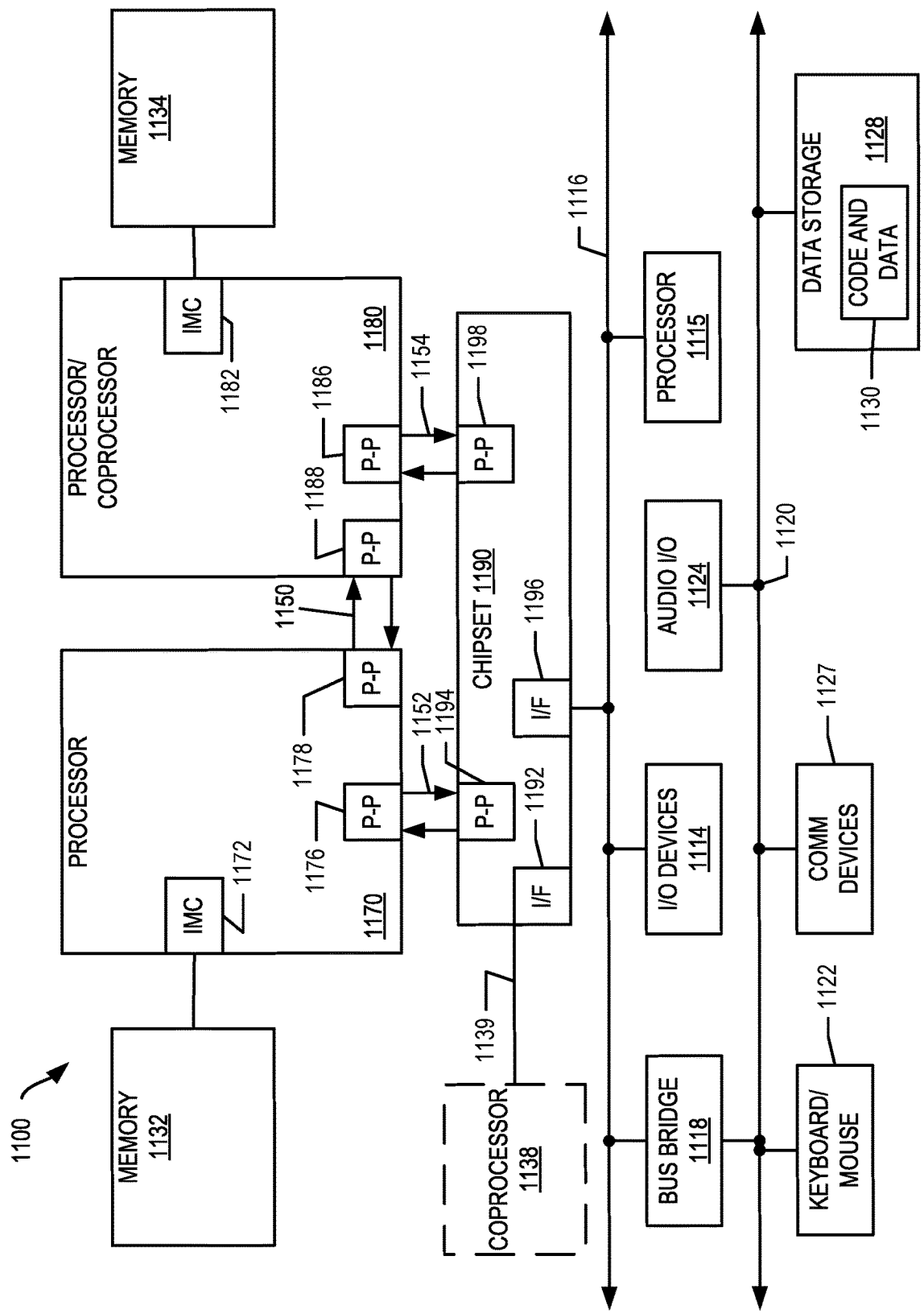
FIG. 11 is a block diagram of a more specific exemplary system in accordance with an example of the present disclosure.

Referring now to FIG. 11, shown is a block diagram of a first more specific exemplary system 1100 in accordance with an example of the present disclosure. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 900. In one example of the disclosure, processors 1170 and 1180 are respectively processors 1010 and 1015, while coprocessor 1138 is coprocessor 1045. In another example, processors 1170 and 1180 are respectively processor 1010 coprocessor 1045.

Processors 1170 and 1180 are shown including integrated memory controller (IMC) units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1139. In one example, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one example, first bus 1116 may be a Peripheral Component Interconnect (PCI) bus, or a bus such as a PCI Express bus or another third generation I/O interconnect bus, although the scope of the present disclosure is not so limited.

As shown in FIG. 11, various I/O devices 1114 may be coupled to first bus 1116, along with a bus bridge 1118 which couples first bus 1116 to a second bus 1120. In one example, one or more additional processor(s) 1115, such as coprocessors, high-throughput MIC processors, GPGPU's, accelerators (such as, e.g., graphics accelerators or digital signal processing (DSP) units), field programmable gate arrays, or any other processor, are coupled to first bus 1116. In one example, second bus 1120 may be a low pin count (LPC) bus. Various devices may be coupled to a second bus 1120 including, for example, a keyboard and/or mouse 1122, communication devices 1127 and a storage unit 1128 such as a disk drive or other mass storage device which may include instructions/code and data 1130, in one example. Further, an audio I/O 1124 may be coupled to the second bus 1120. Note that other architectures are possible. For example, instead of the point-to-point architecture of FIG. 11, a system may implement a multi-drop bus or other such architecture.

Figure 12:
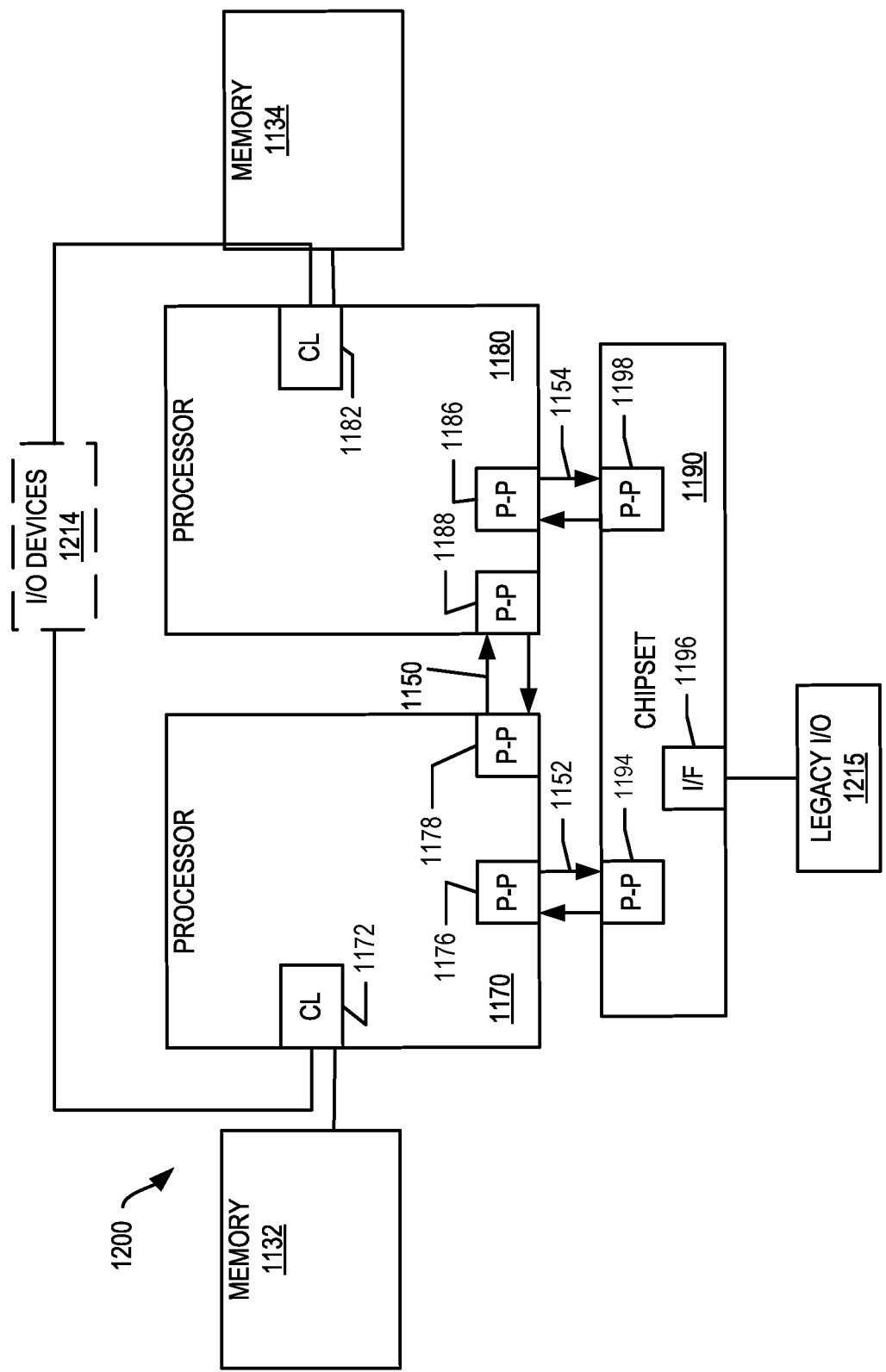
FIG. 12, shown is a block diagram of a second more specific exemplary system in accordance with an example of the present disclosure.

Referring now to FIG. 12, shown is a block diagram of a second more specific exemplary system 1200 in accordance with an example of the present disclosure. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1172 and 1182, respectively. Thus, the CL 1172, 1182 include integrated memory controller units and include I/O control logic. FIG. 12 illustrates that not only are the memories 1132, 1134 coupled to the CL 1172, 1182, but also that I/O devices 1214 are also coupled to the control logic 1172, 1182. Legacy I/O devices 1215 are coupled to the chipset 1190.

Figure 13:
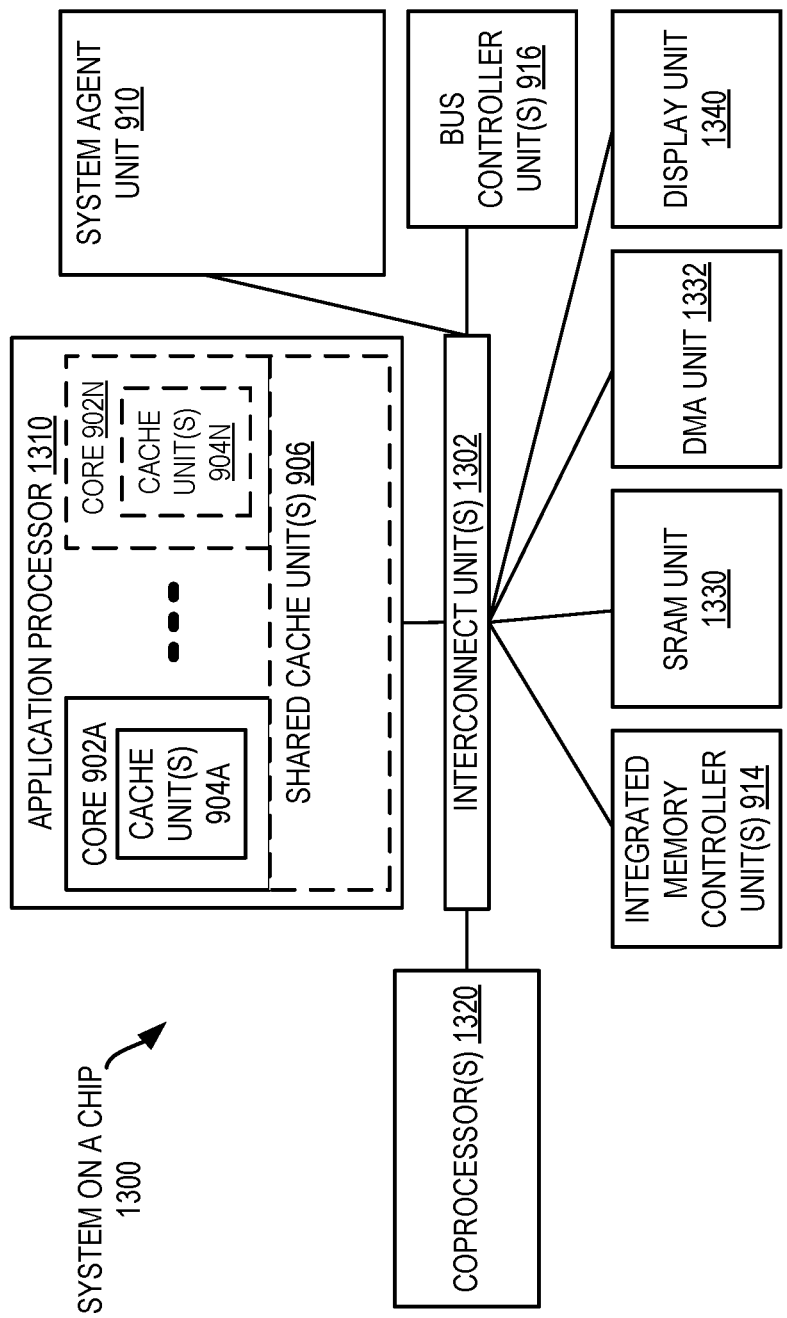
FIG. 13, shown is a block diagram of a system on a chip (SoC) in accordance with an example of the present disclosure.

Referring now to FIG. 13, shown is a block diagram of a SoC 1300 in accordance with an example of the present disclosure. Similar elements in FIG. 9 bear like reference numerals. Also, dashed lined boxes are optional features on more advanced SoCs. In FIG. 13, an interconnect unit(s) 1302 is coupled to: an application processor 1310 which includes a set of one or more cores 902A-N (with respective cache unit(s) 904A-904N) and shared cache unit(s) 906; a system agent unit 910; a bus controller unit(s) 916; an integrated memory controller unit(s) 914; a set or one or more coprocessors 1320 which may include integrated graphics logic, an image processor, an audio processor, and a video processor; an static random access memory (SRAM) unit 1330; a direct memory access (DMA) unit 1332; and a display unit 1340 for coupling to one or more external displays. In one example, the coprocessor(s) 1320 include a special-purpose processor, such as, for example, a network or communication processor, compression engine, GPGPU, a high-throughput MIC processor, embedded processor, or the like.

Examples (e.g., of the mechanisms) disclosed herein may be implemented in hardware, software, firmware, or a combination of such implementation approaches. Examples of the disclosure may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one example may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, examples of the disclosure also include non-transitory, tangible machine-readable media containing instructions or containing design data, such as Hardware Description Language (HDL), which defines structures, circuits, apparatuses, processors and/or system features described herein. Such examples may also be referred to as program products.

Emulation (including binary translation, code morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 14:
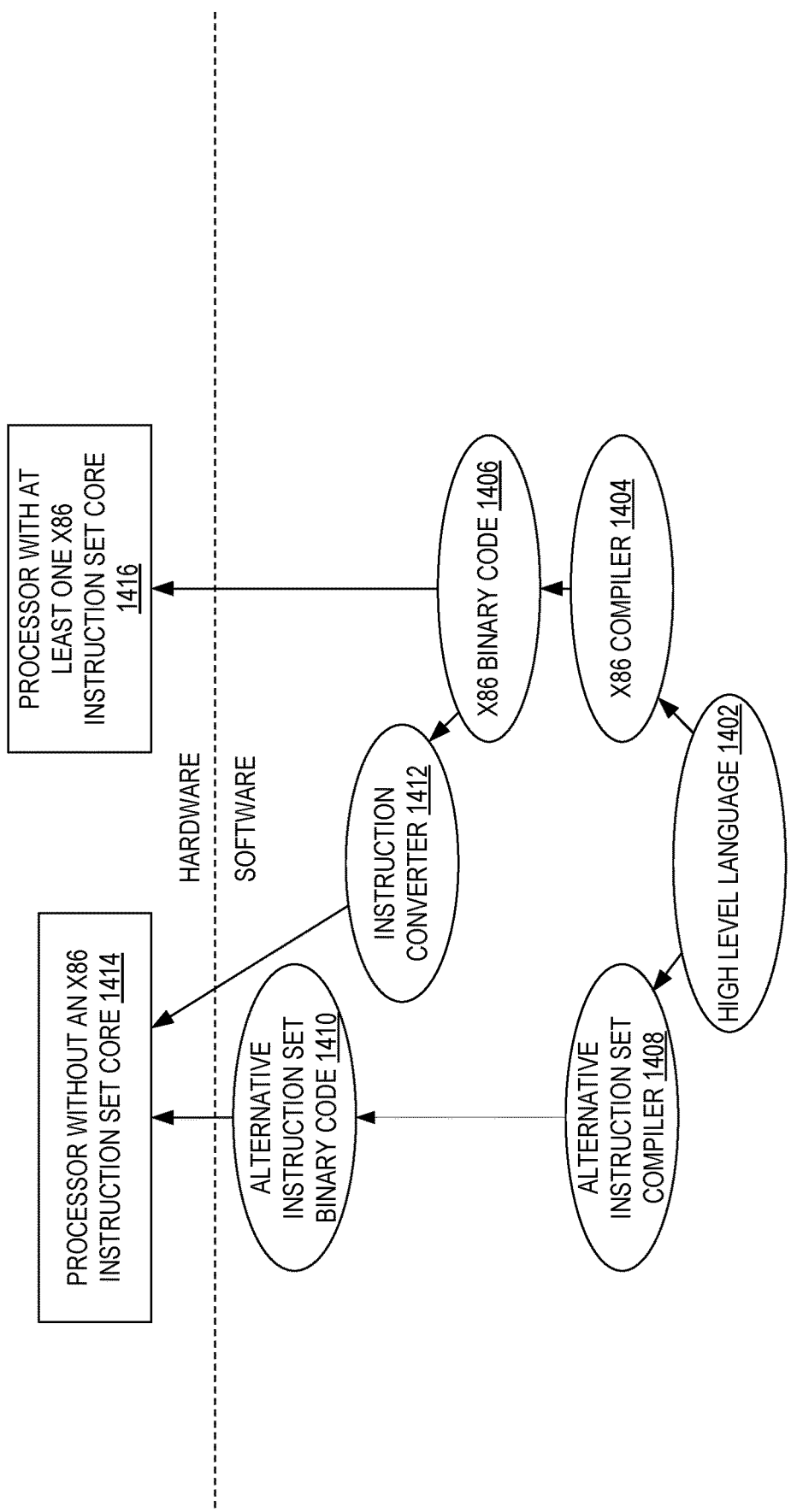
FIG. 14 is a block diagram contrasting the use of a software instruction converter to convert binary instructions in a source instruction set to binary instructions in a target instruction set according to examples of the disclosure.

FIG. 14 is a block diagram contrasting the use of a software instruction converter to convert binary instructions in a source instruction set to binary instructions in a target instruction set according to examples of the disclosure. In the illustrated example, the instruction converter is a software instruction converter, although alternatively the instruction converter may be implemented in software, firmware, hardware, or various combinations thereof. FIG. 14 shows a program in a high-level language 1402 may be compiled using an x86 compiler 1404 to generate x86 binary code 1406 that may be natively executed by a processor with at least one x86 instruction set core 1416. The processor with at least one x86 instruction set core 1416 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 1404 represents a compiler that is operable to generate x86 binary code 1406 (e.g., object code) that can, with or without additional linkage processing, be executed on the processor with at least one x86 instruction set core 1416. Similarly, FIG. 14 shows the program in the high level language 1402 may be compiled using an alternative instruction set compiler 1408 to generate alternative instruction set binary code 1410 that may be natively executed by a processor without at least one x86 instruction set core 1414 (e.g., a processor with cores that execute the MIPS instruction set of MIPS Technologies of Sunnyvale, CA and/or that execute the ARM instruction set of ARM Holdings of Sunnyvale, CA). The instruction converter 1412 is used to convert the x86 binary code 1406 into code that may be natively executed by the processor without an x86 instruction set core 1414. This converted code is not likely to be the same as the alternative instruction set binary code 1410 because an instruction converter capable of this is difficult to make; however, the converted code will accomplish the general operation and be made up of instructions from the alternative instruction set. Thus, the instruction converter 1412 represents software, firmware, hardware, or a combination thereof that, through emulation, simulation, or any other process, allows a processor or other electronic device that does not have an x86 instruction set processor or core to execute the x86 binary code 1406.

What is claimed is:

1. A hardware processor core comprising:
   a first decode cluster comprising a plurality of decoder circuits;
   a second decode cluster comprising a plurality of decoder circuits; and
   a toggle point control circuit to toggle between sending instructions requested for decoding between the first decode cluster and the second decode cluster, wherein the toggle point control circuit is to:
      determine a location in an instruction stream as a candidate toggle point to switch the sending of the instructions requested for decoding between the first decode cluster and the second decode cluster,
track a number of times a characteristic of multiple previous decodes of the instruction stream is present for the location, and
cause insertion of a toggle point at the location, based on the number of times, to switch the sending of the instructions requested for decoding between the first decode cluster and the second decode cluster.

2. The hardware processor core of claim 1, wherein the characteristic is a number of micro-operations decoded from the instruction stream before the location and after an immediately previous switch of decoding of the instruction stream between the first decode cluster and the second decode cluster.

3. The hardware processor core of claim 1, wherein the characteristic is a number of macro-instructions decoded from the instruction stream before the location and after an immediately previous switch of decoding of the instruction stream between the first decode cluster and the second decode cluster.

4. The hardware processor core of claim 1, wherein the insertion of the toggle point comprises insertion of a branch instruction in a branch target buffer of the hardware processor core.

5. The hardware processor core of claim 1, wherein the toggle point control circuit is to further remove the location as the candidate toggle point when an existing toggle point is encountered within a threshold number of instructions after the location in a subsequent decode of the instruction stream.

6. The hardware processor core of claim 1, wherein the characteristic is a number of micro-operations decoded from the instruction stream before the location.

7. The hardware processor core of claim 1, wherein the toggle point control circuit comprises a timer and is to stop tracking the number of times the characteristic of multiple previous decodes of the instruction stream is present for the location after a tracking time from the timer exceeds a threshold time.

8. The hardware processor core of claim 1, wherein the toggle point control circuit is to determine a plurality of candidate toggle points and track a corresponding number of times a respective characteristic of multiple previous decodes of the instruction stream is present for each respective location.

9. A method comprising:
receiving an instruction stream requested for decode by a hardware processor core comprising a first decode cluster having a plurality of decoder circuits and a second decode cluster having a plurality of decoder circuits;
determining, by a toggle point control circuit of the hardware processor core, a location in the instruction stream as a candidate toggle point to switch sending of the instructions requested for decoding between the first decode cluster and the second decode cluster;
tracking, by the toggle point control circuit, a number of times a characteristic of multiple previous decodes of the instruction stream is present for the location; and
inserting a toggle point at the location, based on the number of times, to switch the sending of the instructions requested for decoding between the first decode cluster and the second decode cluster.

10. The method of claim 9, wherein the characteristic is a number of micro-operations decoded from the instruction stream before the location and after an immediately previous switch of decoding of the instruction stream between the first decode cluster and the second decode cluster.

11. The method of claim 9, wherein the characteristic is a number of macro-instructions decoded from the instruction stream before the location and after an immediately previous switch of decoding of the instruction stream between the first decode cluster and the second decode cluster.

12. The method of claim 9, wherein the insertion of the toggle point comprises inserting a branch instruction in a branch target buffer of the hardware processor core.

13. The method of claim 9, further comprising removing the location as the candidate toggle point when an existing toggle point is encountered within a threshold number of instructions after the location in a subsequent decode of the instruction stream.

14. The method of claim 9, wherein the characteristic is a number of micro-operations decoded from the instruction stream before the location.

15. The method of claim 9, further comprising stopping the tracking of the number of times the characteristic of multiple previous decodes of the instruction stream is present for the location after a tracking time exceeds a threshold time.

16. The method of claim 9, wherein the determining comprises determining a plurality of candidate toggle points and the tracking comprises tracking a corresponding number of times a respective characteristic of multiple previous decodes of the instruction stream is present for each respective location.

17. An apparatus comprising:
a memory to store instructions;
a first decode cluster comprising a plurality of decoder circuits;
a second decode cluster comprising a plurality of decoder circuits; and
a toggle point control circuit to toggle between sending the instructions requested for decoding between the first decode cluster and the second decode cluster, wherein the toggle point control circuit is to:
determine a location in an instruction stream as a candidate toggle point to switch the sending of the instructions requested for decoding between the first decode cluster and the second decode cluster,
track a number of times a characteristic of multiple previous decodes of the instruction stream is present for the location, and
cause insertion of a toggle point at the location, based on the number of times, to switch the sending of the instructions requested for decoding between the first decode cluster and the second decode cluster.

18. The apparatus of claim 17, wherein the characteristic is a number of micro-operations decoded from the instruction stream before the location and after an immediately previous switch of decoding of the instruction stream between the first decode cluster and the second decode cluster.

19. The apparatus of claim 17, wherein the characteristic is a number of macro-instructions decoded from the instruction stream before the location and after an immediately previous switch of decoding of the instruction stream between the first decode cluster and the second decode cluster.

20. The apparatus of claim 17, wherein the insertion of the toggle point comprises insertion of a branch instruction in a branch target buffer.

21. The apparatus of claim 17, wherein the toggle point control circuit is to further remove the location as the candidate toggle point when an existing toggle point is encountered within a threshold number of instructions after the location in a subsequent decode of the instruction stream.

22. The apparatus of claim 17, wherein the characteristic is a number of micro-operations decoded from the instruction stream before the location.

23. The apparatus of claim 17, wherein the toggle point control circuit comprises a timer and is to stop tracking the number of times the characteristic of multiple previous decodes of the instruction stream is present for the location after a tracking time from the timer exceeds a threshold time.

24. The apparatus of claim 17, wherein the toggle point control circuit is to determine a plurality of candidate toggle points and track a corresponding number of times a respective characteristic of multiple previous decodes of the instruction stream is present for each respective location.

* * * * *